United States Patent
Suzuki et al.

(10) Patent No.: US 6,318,782 B1
(45) Date of Patent: Nov. 20, 2001

(54) OPENING/CLOSING REAR COMPONENT STRUCTURE OF A VEHICLE

(75) Inventors: Toshifumi Suzuki; Reiji Kikuchi; Masaya Watanabe; Takami Kirita, all of Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/640,075

(22) Filed: Aug. 17, 2000

(30) Foreign Application Priority Data

Aug. 20, 1999 (JP) .................................................. 11-233409

(51) Int. Cl.$^7$ ....................................................... B60R 5/00
(52) U.S. Cl. .................... 296/37.1; 296/37.16; 296/106; 296/76; 296/146.8
(58) Field of Search ................................ 296/37.16, 106, 296/76, 146.8

(56) References Cited

U.S. PATENT DOCUMENTS

| | | | | |
|---|---|---|---|---|
| 2,767,896 | * | 10/1956 | Beck | 296/37.16 |
| 2,889,097 | * | 6/1959 | Broehl | 296/37.16 |
| 3,010,760 | * | 11/1961 | Trautmann | 296/37.16 |
| 3,110,429 | * | 11/1963 | Philips | 296/37.16 |
| 3,291,520 | * | 12/1966 | Smith | 296/37.16 |
| 3,713,472 | * | 1/1973 | Dozois | 296/146.8 |
| 4,413,854 | * | 11/1983 | Hirshberg | 296/37.16 |
| 5,865,497 | * | 2/1999 | Klein et al. | 296/37.16 |
| 6,007,139 | * | 12/1999 | Shave | 296/146.8 |
| 6,050,202 | * | 4/2000 | Thompson | 206/37.16 |
| 6,068,327 | * | 5/2000 | Jiginger | 296/146.8 |
| 6,113,172 | * | 9/2000 | Chaloult et al | 296/37.16 |
| 6,176,535 | * | 1/2001 | Chaloult et al. | 296/37.16 |

FOREIGN PATENT DOCUMENTS

| | | | | |
|---|---|---|---|---|
| 510321 | * | 2/1955 | (CA) | 296/106 |
| 000565430 | * | 10/1993 | (EP) | 296/37.16 |
| 0203824 | * | 12/1986 | (EP) | 296/47.16 |
| 002696704 | * | 4/1994 | (FR) | 296/146.8 |
| 002703005 | * | 9/1994 | (FR) | 296/146.8 |
| 6-68938 | | 9/1994 | (JP) . | |
| 361263847 | * | 11/1986 | (JP) | 296/37.16 |

* cited by examiner

*Primary Examiner*—Joseph D. Pape
*Assistant Examiner*—Kiran B. Patel
(74) *Attorney, Agent, or Firm*—Nixon Peabody LLP; Donald R. Studebaker

(57) ABSTRACT

It is an object of the invention to provide an opening/closing rear component structure of a vehicle, comprising a luggage space being divided into a upper luggage space and a lower luggage space, a openable/closable door being provided to the upper luggage space and the lower luggage space respectively, and the door for the upper luggage space and the door for the lower luggage space being adapted to selectively adopt either a mode of opening/closing the door for the upper luggage space and the door for the lower luggage space integrally so that the upper luggage space and the lower luggage space may be opened/closed at the same time, or a mode of, opening/closing the door independently so that the upper luggage space and/or the lower luggage space may be opened/closed, whereby it becomes possible to selectively adopt an independent luggage space separated from the compartment (such a luggage space as a sedan-type vehicle has) or a large luggage space in which large luggage can be loaded and unloaded easily (such a luggage space as a hatchback-type vehicle has), and it becomes also possible to keep the air-conditioning from lessening its effect when the independent luggage space is opened/closed, and also possible to store, for example, dirty luggage and the like in the independent luggage space.

9 Claims, 25 Drawing Sheets

OPENING/CLOSING REAR COMPONENT STRUCTURE OF A VEHICLE

TECHNICAL FIELD OF THE INVENTION

This invention relates to an opening/closing rear component structure of a vehicle for opening/closing a luggage space provided in the rear of the vehicle.

BACKGROUND OF THE INVENTION

Concerning with an opening/closing rear component structure of a vehicle mentioned above, there is a conventional structure described, for example, in Japanese registered utility model laid-open publication No. Hei 6-68938.

More specifically, it is such an opening/closing rear component structure that a back door is openably/closably supported on an upper portion of the rear of a vehicle body to open/close a rear luggage space, an opening for a rear window is formed corresponding to an upper half of this back door and a rear window is openably/closably mounted on this opening.

According to this conventional structure, it is possible to load and unload large luggage easily when the whole back door is opened/closed, and also possible to load and unload small luggage such as hand luggage when only the rear window is opened/closed, which offers advantages improving the operability of opening/closing the back door and the rear window and also loadability and unloadability of luggage, whereas there arises such a problem as stated below.

More specifically, the conventional structure as stated above has problems that the effect of the air-conditioning is lessened owing to intrusion of the outside air into the compartment of the vehicle because the compartment is communicated with the outside of the vehicle when the rear window is opened on air-conditioning, and there arises feeling awkward about loading, for example, dirty luggage and the like into the rear luggage space because it is not so constituted like a sedan-type vehicle as to have an independent luggage space.

SUMMARY OF THE INVENTION

It is an object of the present invention to provide an opening/closing rear component structure of a vehicle, comprising a luggage space being divided into a upper luggage space and a lower luggage space, a openable/closable door being provided to the upper luggage space and the lower luggage space respectively, and the door for the upper luggage space and the door for the lower luggage space being adapted to selectively adopt either a mode of opening/closing the door for the upper luggage space and the door for the lower luggage space integrally so that the upper luggage space and the lower luggage space may be opened/closed at the same time, or a mode of opening/closing the door independently so that the upper luggage space and/or the lower luggage space may be opened/closed, whereby it becomes possible to selectively adopt an independent luggage space separated from the compartment (such a luggage space as a sedan-type vehicle has) or a large luggage space in which large luggage can be loaded and unloaded easily (such a luggage space as a hatchback-type vehicle has), and it becomes also possible to keep the air-conditioning from lessening its effect when the independent luggage space is opened/closed, and also possible to store, for example, dirty luggage and the like in the independent luggage space.

It is another object of the present invention to provide an opening/closing rear component structure of a vehicle, comprising the door for the upper luggage space being openably/closably supported on a vehicle body via a hinge means, and the door for the lower luggage space being openably/closably supported on the door for the upper luggage space via a hinge means, whereby it becomes possible to load and unload large luggage when the door for the upper luggage space is opened/closed, and to load and unload luggage in the independent luggage space (the lower luggage space) separated from the compartment when the door for the lower luggage space is opened/closed.

Another object of the present invention to provide an opening/closing rear component structure of a vehicle, comprising a partition member being provided to separate the upper luggage space from the lower luggage space, and the partition member provided movably relative to the vehicle body being adapted to selectively adopt either a mode of separating the upper luggage space from the lower luggage space, or a mode of making both of these luggage spaces communicable with each other, whereby it becomes possible to use the lower luggage space as an independent luggage space when the luggage space is separated by the partition member, and it becomes possible to form one large communicable luggage space out of both luggage spaces when both spaces are made communicable by the partition member and at the same time small articles can be loaded and unloaded from the compartment, thus improving the availability of the structure.

Another object of the present invention to provide an opening/closing rear component structure of a vehicle, comprising said door for the lower luggage space being mounted to said door for the upper luggage space via a link member so that said door for the lower luggage space may be opened/closed by moving vertically in parallel, whereby it becomes possible to easily open/close the door for the lower luggage space even if the space for opening/closing the door existing backward from the vehicle is small.

Another object of the present invention to provide an opening/closing rear component structure of a vehicle, comprising the upper portion of said door for the lower luggage space being openably/closably supported on said door for the upper luggage space via a hinge means, whereby it may simplify the opening/closing door mechanism and improve the operability of opening/closing the doors by making each door open/close in the same direction.

The present invention includes an opening/closing rear component structure of a vehicle for opening/closing a luggage space provided in the rear of the vehicle, comprising said luggage space being divided into a upper luggage space and a lower luggage space, a openable/closable door being provided to the upper luggage space and the lower luggage space respectively, and the door for the upper luggage space and the door for the lower luggage space being adapted to selectively adopt either a mode of opening/closing the door for the upper luggage space and the door for the lower luggage space integrally so that the upper luggage space and the lower luggage space may be opened/closed at the same time, or a mode of opening/closing the door independently so that the upper luggage space and/or the lower luggage space may be opened/closed.

In addition to the forgoing construction of the invention, the present invention includes an opening/closing rear component structure of a vehicle, comprising said door for the upper luggage space being openably/closably supported on a vehicle body via a hinge means, and said door for the lower luggage space being openably/closably supported on the door for the upper luggage space via a hinge means.

In addition to the forgoing construction of the invention, the present invention includes an opening/closing rear component structure of a vehicle, comprising a partition member being provided to separate the upper luggage space from the lower luggage space, said partition member being provided movably relative to a vehicle body, and said partition member being adapted to selectively adopt either a mode of separating the upper luggage space from the lower luggage space, or a mode of making both of these luggage spaces communicable with each other.

The present invention further includes an opening/closing rear component structure of a vehicle, comprising the upper portion of said door for the lower luggage space being mounted to said door for the upper luggage space via a link member so that said door for the lower luggage space may be opened/closed by moving vertically in parallel.

The present invention further includes an opening/closing rear component structure of a vehicle, comprising the upper portion of said door for the lower luggage space being openably/closably supported on said door for the upper luggage space via a hinge means.

According to the present invention, when the door for the upper luggage space and the door for the lower luggage space are integrally opened/closed, the upper luggage space and the lower luggage space can be opened/closed at the same time (a mode of integrally opening/closing).

Additionally, the door for the upper luggage space is openably/closably supported on the vehicle body by a hinge means, and the door for the lower luggage space is openably/closably supported on the door for the upper luggage space by a hinge means, and has advantages that it becomes possible to load and unload large luggage in a large luggage space by opening/closing the door for the lower luggage space integrally with the door for the upper luggage space when the door for the upper luggage space is opened/closed, and to load and unload luggage in the independent luggage space (the lower luggage space) separated from the compartment when the door for the lower luggage space is opened/closed.

On the other hand, when the doors are opened/closed independently to open/close the upper luggage space and/or the lower luggage space, the luggage space corresponding to the door is opened/dosed (the mode of independently opening/closing).

Thus, it becomes possible to secure an independent luggage space separated from the compartment (such a luggage space as a sedan-type vehicle has).

Thus, this invention has advantages that it becomes possible to selectively use either an independent luggage space separated from the compartment or a large luggage space in which large luggage can be loaded and unloaded easily, and when the independent luggage space opened/closed it becomes also possible to keep the air-conditioning from lessening its effect, and also possible to store, for example, dirty luggage and the like in the independent luggage space.

The invention as set forth in claim 2 of the present invention comprises, in addition to the construction of the invention as set forth in claim 1, the door for the upper luggage space being openably/closably supported o body by a hinge means, and the door for the lower luggage space being openably/closably supported on the door for the upper luggage space by a hinge means, and has advantages that it becomes possible to load and unload large luggage in a large luggage space by opening/closing the door for the lower luggage space integrally with the door for the upper luggage space when the door for the upper luggage space is opened/ closed, and to load and unload luggage in the independent luggage space (the lower luggage space) separated from the compartment when the door for the lower luggage space is opened/closed.

The present invention has advantages that it becomes possible to use the lower luggage space as an independent luggage space when the luggage space is separated by the partition member provided movably relative to the vehicle body (in the mode of separating the luggage spaces), and it becomes possible to form one large communicable luggage space out of the upper and lower luggage spaces when the upper luggage space and the lower luggage space are made communicable by the partition member.

Furthermore, the invention has an advantage that small articles can be loaded and unloaded to the lower luggage space from the compartment, thus improving the availability of the luggage spaces.

In addition to the advantages of the invention set forth hereinabove, the present invention has advantages that, it becomes possible to easily open/close the door for the lower luggage space even if a space for opening/closing the door existing backward from the vehicle is small as said door for the lower luggage space is opened/closed by moving vertically in parallel as a function of the link member.

In addition to the advantages of the invention set forth hereinabove, the present invention has advantages that as said door for the lower luggage space is pivotally moved with the upper hinge means as pivotal axis to be opened/ closed relative to the door for the upper luggage space, it becomes possible to eliminate a complicated opening/ closing door mechanism such as link members, simplify this opening/closing mechanism and also improve the opening/ closing operability of the doors by making each door open/ close in the same direction.

PREFERRED EMBODIMENT OF THE INVENTION

Figure 1:
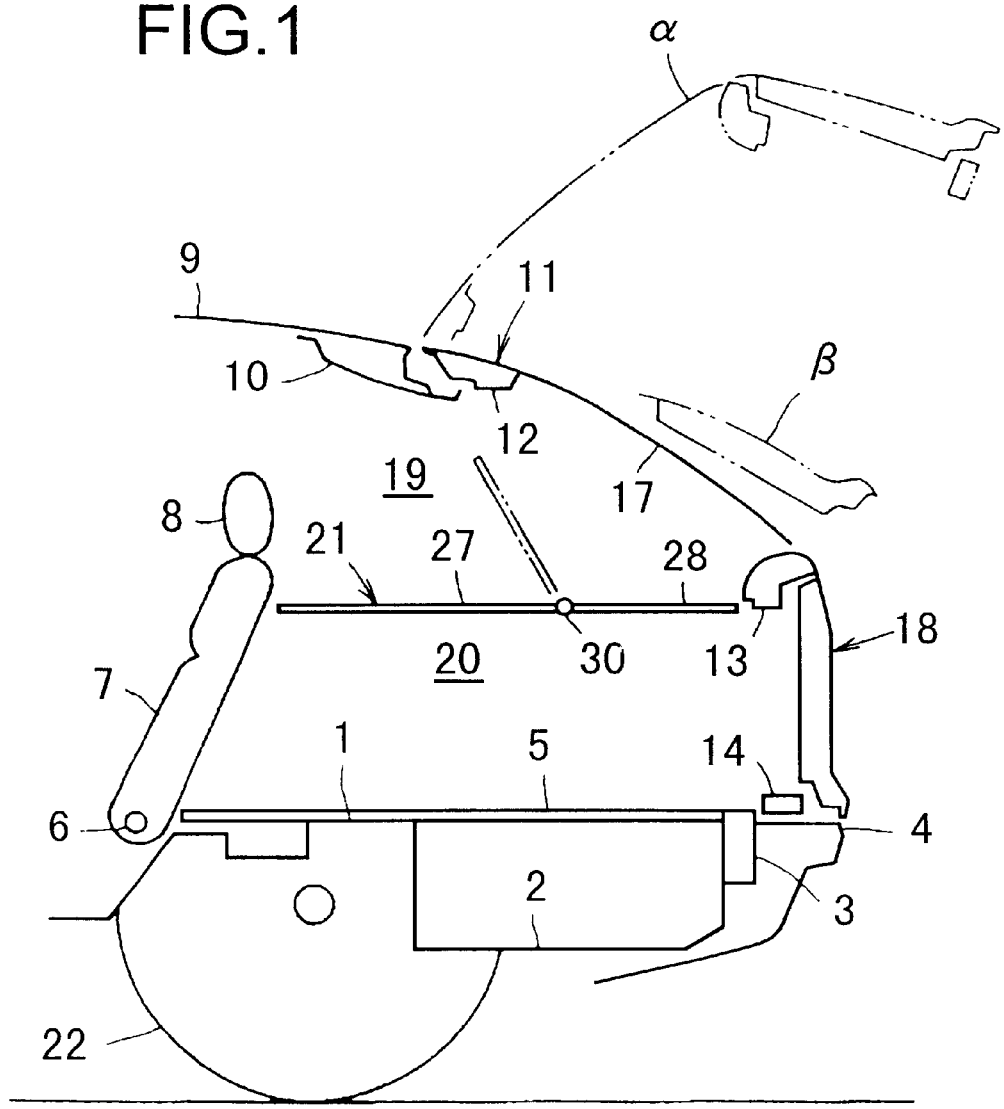
FIG. 1 is a schematic side elevational view showing an opening/closing rear component structure of a vehicle according to the present invention.

A detailed explanation of one embodiment of the present invention will be given based on the drawings.

The drawings show an opening/closing rear component structure of a vehicle, and in FIGS. 1 through 4, a concave secret box 2 is formed one step below in the rear portion of a rear floor 1, and at the same time in the rear of the secret box 2, a rear cross member 3 is formed extending in the direction of the width of the vehicle, and a rear bumper 4 is fitted to the rear cross member 3.

A floor mat 5 is provided to cover the opening of said secret box 2 and the surface of the rear floor 1, while a headrest 8 is mounted on a seat back 7 of a rear seat which is made movable slantways with the supporting point 6 as pivotal axis.

A rear header 10 extending in the direction of the width of the vehicle is jointed at the rear end of the roof panel 9, and a main door (a door for a upper luggage space, so-called main gate) 11 is openably/closably supported on the upper portion of this rear header 10 as the supporting point.

This main door 11 formed in 日 shape in rear view includes an upper frame portion 12, a middle frame portion 13, a lower frame portion 14, and right and left side frame portions 15, 16, and a rear window glass 17 is mounted on the upper opening portion of the 日 shaped opening, and a sub door (a door for a lower luggage space, so-called sub gate) 18 is openably/closably supported on the lower opening portion of the 日 shaped opening with its upper portion as the supporting point.

A rear luggage space is also formed surrounded by said elements 7,8,9,11 and 18, and this rear luggage space is divided into a upper luggage space 19 and a lower luggage space 20.

In this embodiment, a package tray 21 as a partition member to separate the upper luggage space from the lower luggage space, is adapted to be movable relative to the vehicle body in such a construction that it moves in association with the seat back 7 or is only detachable.

Figure 2:
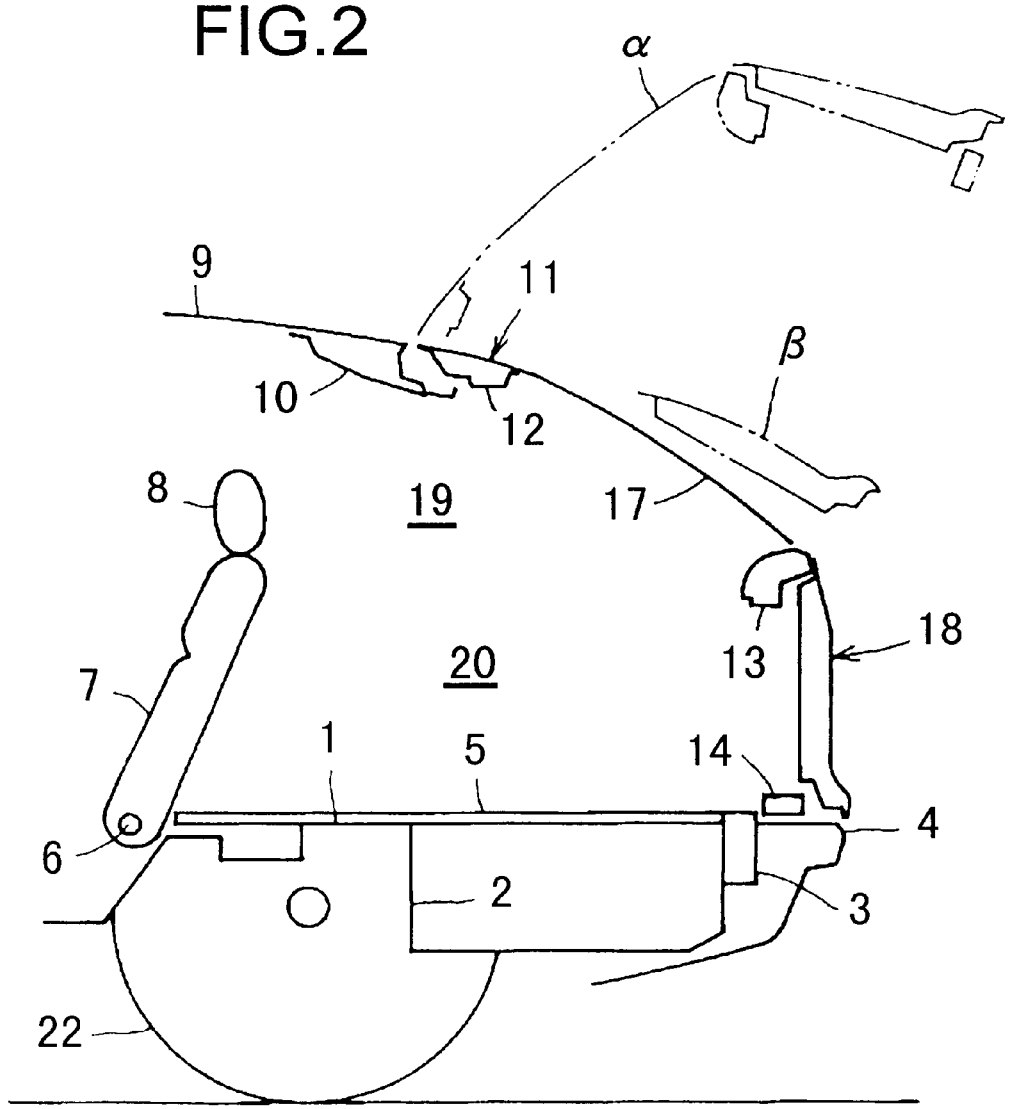
FIG. 2 is a schematic side elevational view of an upper luggage space made communicable with a lower luggage space.
Figure 3:
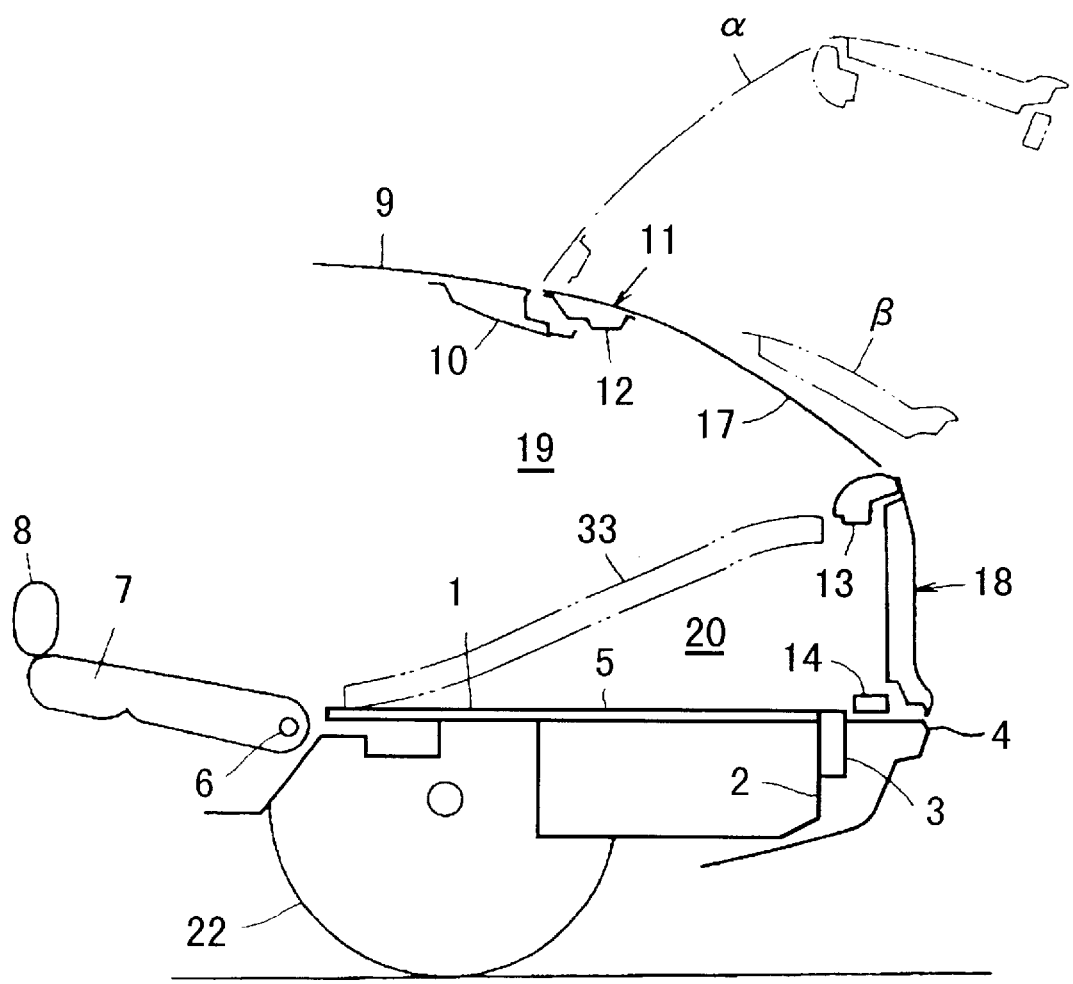
FIG. 3 is a schematic side elevational view showing the state of forming a large luggage space on a seat back and a floor mat.

Now, said main door, 11 and sub door 18 are adapted to selectively adopt either a mode of opening/closing both doors 11 and 18 integrally as shown with a phantom line α in FIGS. 1 through 3 so that the upper luggage space 19 and the lower luggage space 20 may be opened/closed at the same time (a mode of integrally opening/closing), or a mode of independently opening/closing only the sub door 18 as shown with a phantom line β in FIGS. 1 through 3 so that the lower luggage space 20 may be opened/closed (a mode of independently opening/closing).

The package tray 21 as a partition member is so adapted, as shown in FIG. 1, to selectively adopt either a mode of separating the luggage space into the upper luggage space 19 and the lower luggage space 20 (a mode of separating luggage spaces) or a mode of communicating both luggage spaces 19 and 20 with each other (a mode of communicating luggage spaces) as shown in FIGS. 2 and 3.

Further, in FIGS. 1 through 4, 22 indicates a rear wheel, 23 indicates a rear combination lamp, and 24 indicates a rear pillar.

Figure 5:
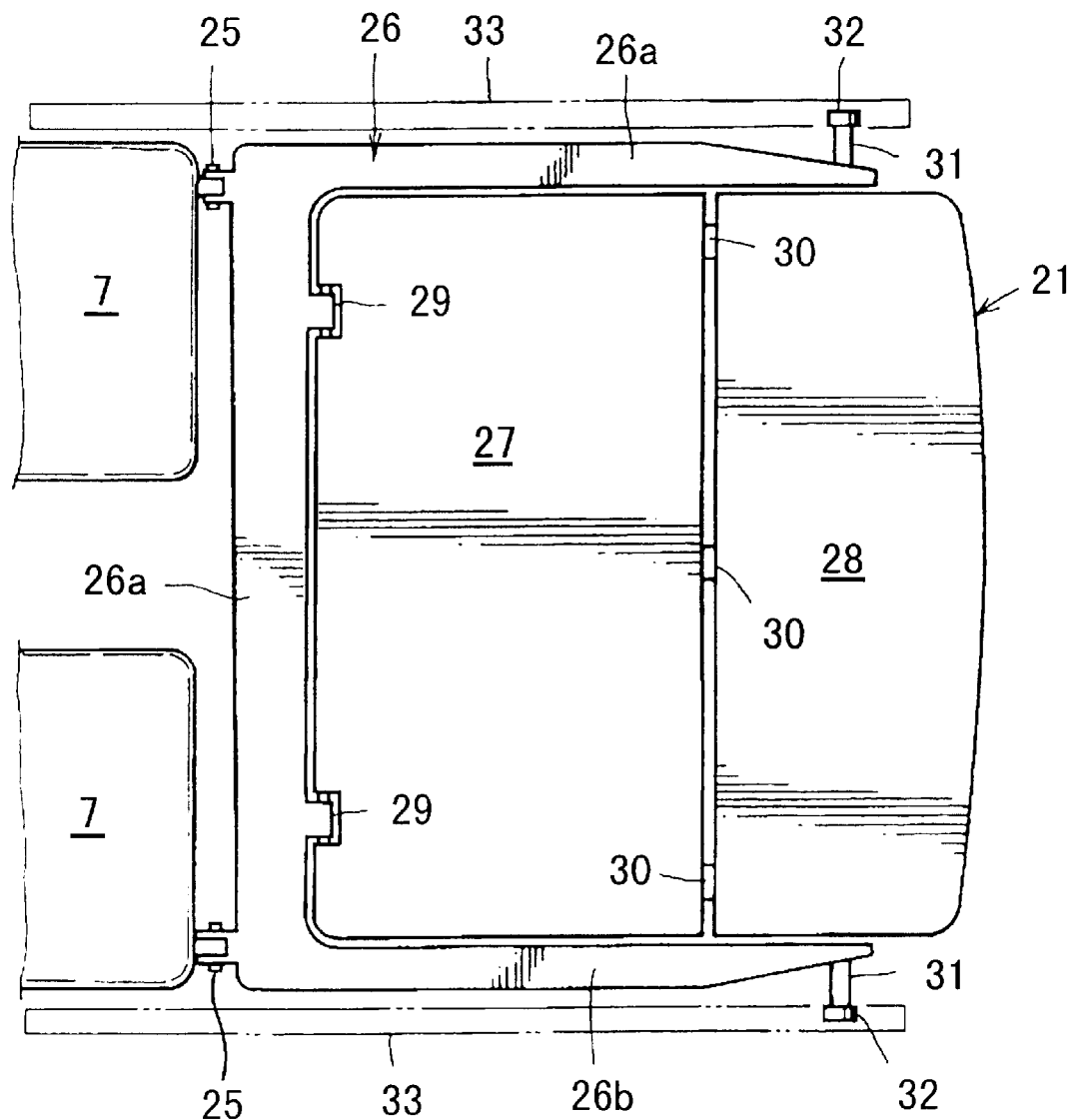
FIG. 5 is a plan view of a partition member.

Structures shown in FIGS. 3 and 5 shall be adopted when said package tray 21 is formed movable in association with the seat back 7.

More specifically, as shown in the plan view in FIG. 5, a tray frame 26 in ⊐ shape in plane view is provided to be jointed with the back portion of the right and left seat backs 7, 7 via hinge means 25,25 and a front tray 27 and a rear tray 28 are also provided on the aperture of this tray frame 26, jointing the back side of the base portion 26a of the tray frame 26 extending in the direction of the width of the vehicle with the front side of the front tray 27 by hinge means 29, 29 and also jointing the rear end of the front tray 27 with the front end of the rear tray 28 by a plurality of hinges 30,30.

Now, the undersides on the right side and on the left side of said front tray 27 and rear tray 28 are received on receiving members (not shown) provided on the tray frame 26.

Guide rollers 32, 32 are rotatably provided on the rear outer surfaces of right and left leg portions 26b, 26b of the tray frame 26 through arms 31, 31 extending outwardly in the direction of the width of the vehicle, respectively.

On the other hand, guide rails 33, 33 in ⊐ shape and slanted in a low-in-front, high-in-rear fashion are installed to the vehicle body as shown with a phantom line in FIGS. 3 and 5, and each guide groove of the right and left guide rails 33, 33 is positioned opposite to each other, and each guide roller 32, 32 is positioned rotatably within each groove.

Thus constituted, on slanting the seat back 7 forward from the position shown in FIG. 1 to the position shown in FIG. 3 after folding up the rear tray 28 on the front tray 27, the tray frame 26 is dragged forward by the seat back 7 as the guide rollers 32 are guided by the guide rails 33, and when the seat back 7 has been completely slanted forward, the package tray 21 is located on the top surface of the seat back 7, being nearly flattened on the floor mat 5 and making it possible to use an ample space formed on the top surface of the seat back 7 and the top surface of the floor mat 5 for a large luggage space as shown in FIG. 3.

Figure 4:
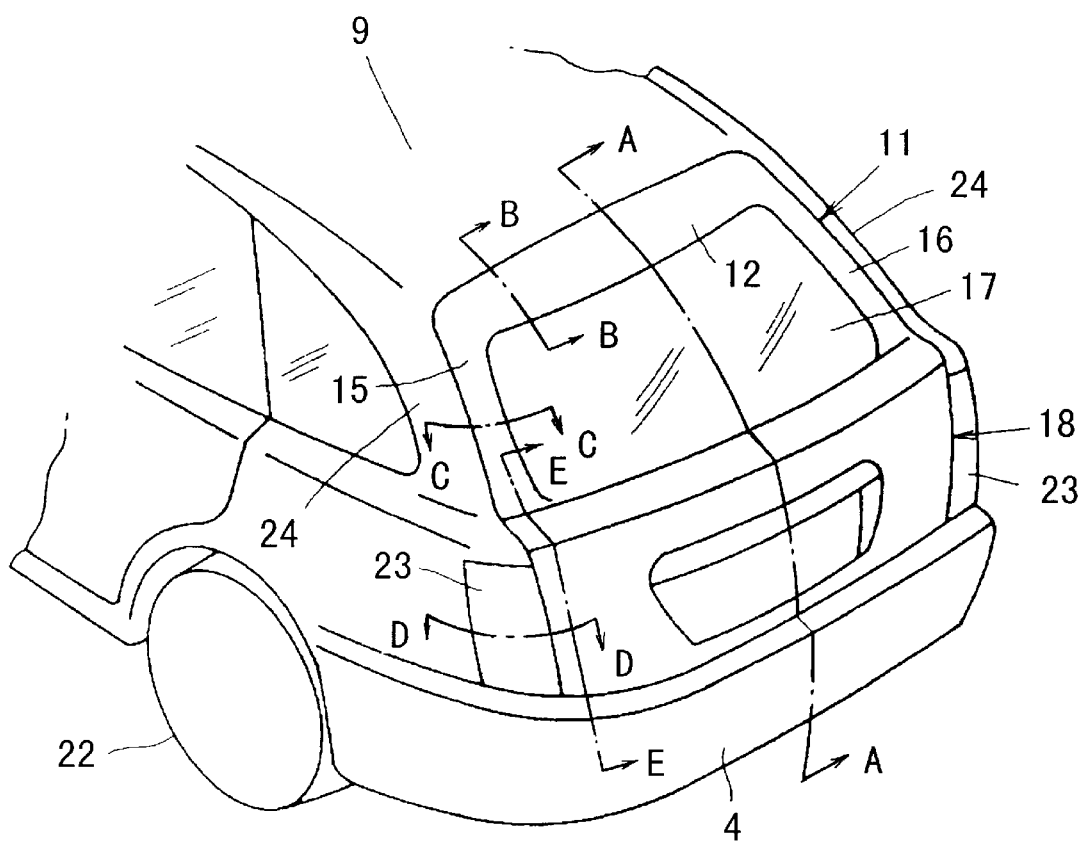
FIG. 4 is a partially perspective view of a vehicle.
Figure 6:
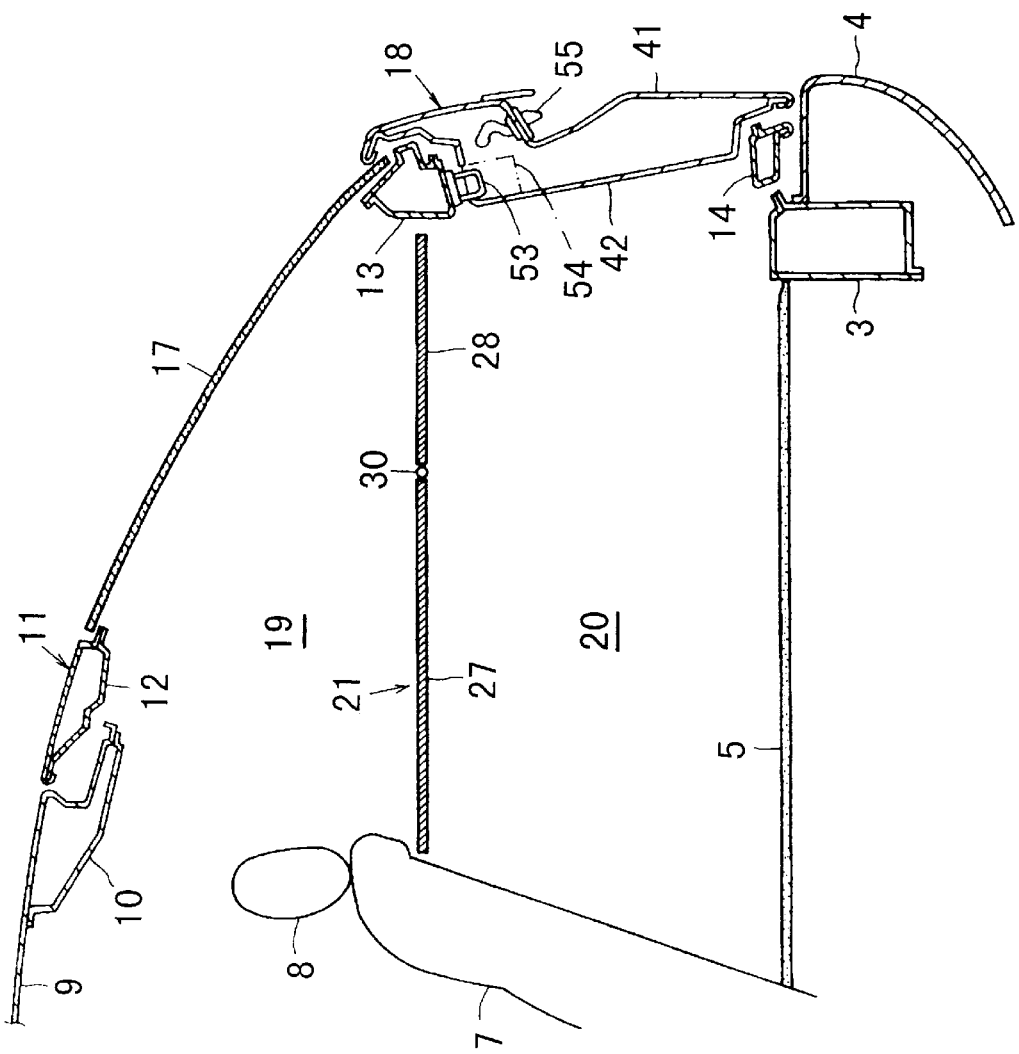
FIG. 6 is a sectional view taken in the direction of arrows along the line A—A of FIG. 4.

A more detailed explanation will be given of a opening/closing rear component structure of a vehicle in reference to FIGS. 6 through 11. FIG. 6 is a sectional view taken in the direction of arrows along the line A—A of FIG. 4, FIG. 7 is a sectional view taken in the direction of arrows along the line B—B of FIG. 4, FIG. 8 is a sectional view taken in the direction of arrows along the line C—C of FIG. 4, FIG. 9 is a sectional view taken in the direction of arrows along the line D—D of FIG. 4, and FIG. 10 is a sectional view taken in the direction of arrows along the line E—E of FIG. 4.

Figure 7:
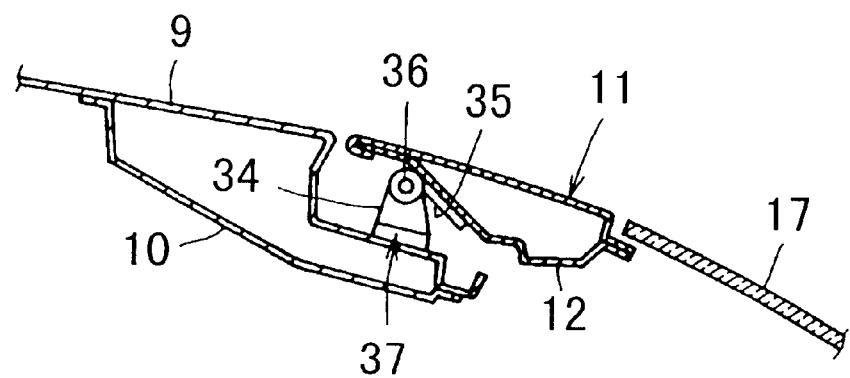
FIG. 7 is a sectional view taken in the direction of arrows along the line B—B of FIG. 4.
Figure 9:
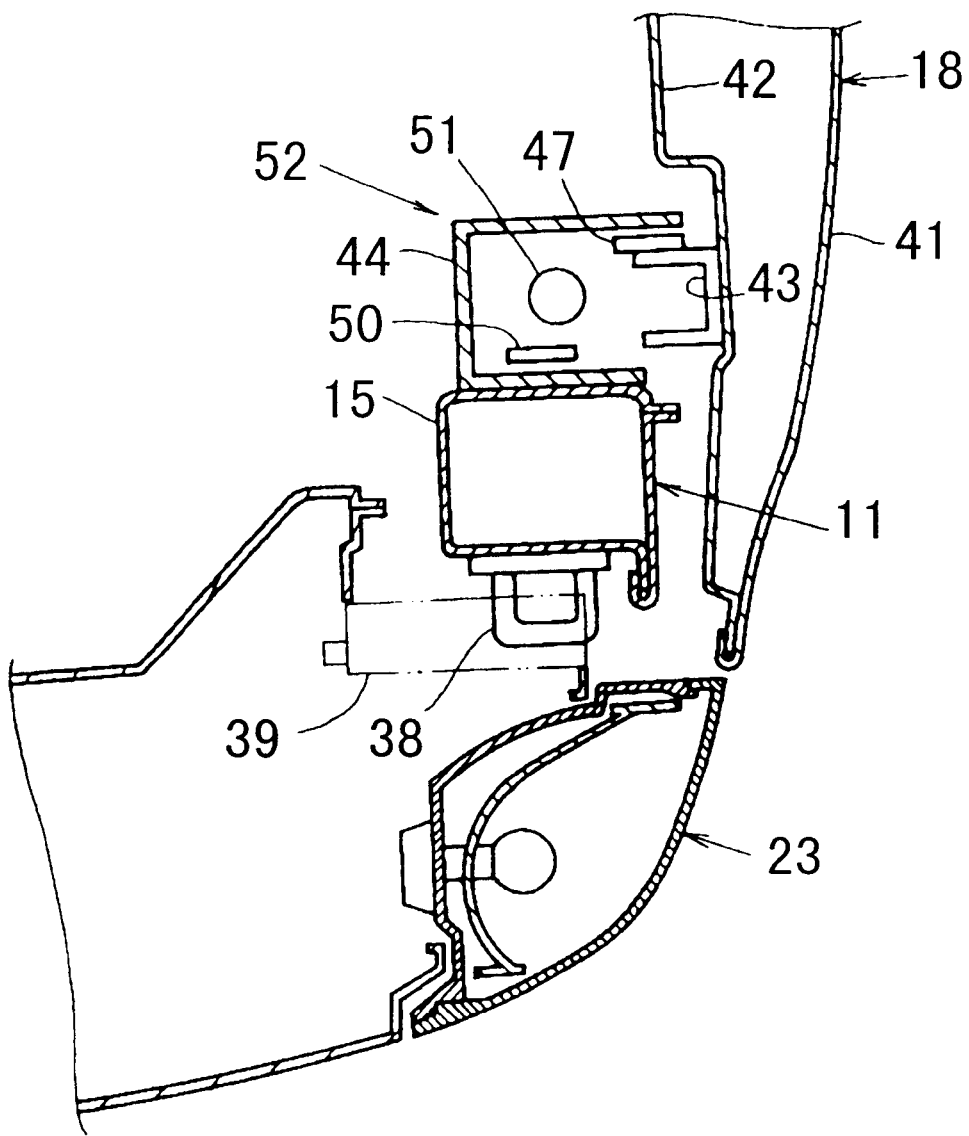
FIG. 9 is a sectional view taken in the direction of arrows along the line D—D of FIG. 4.
Figure 11:
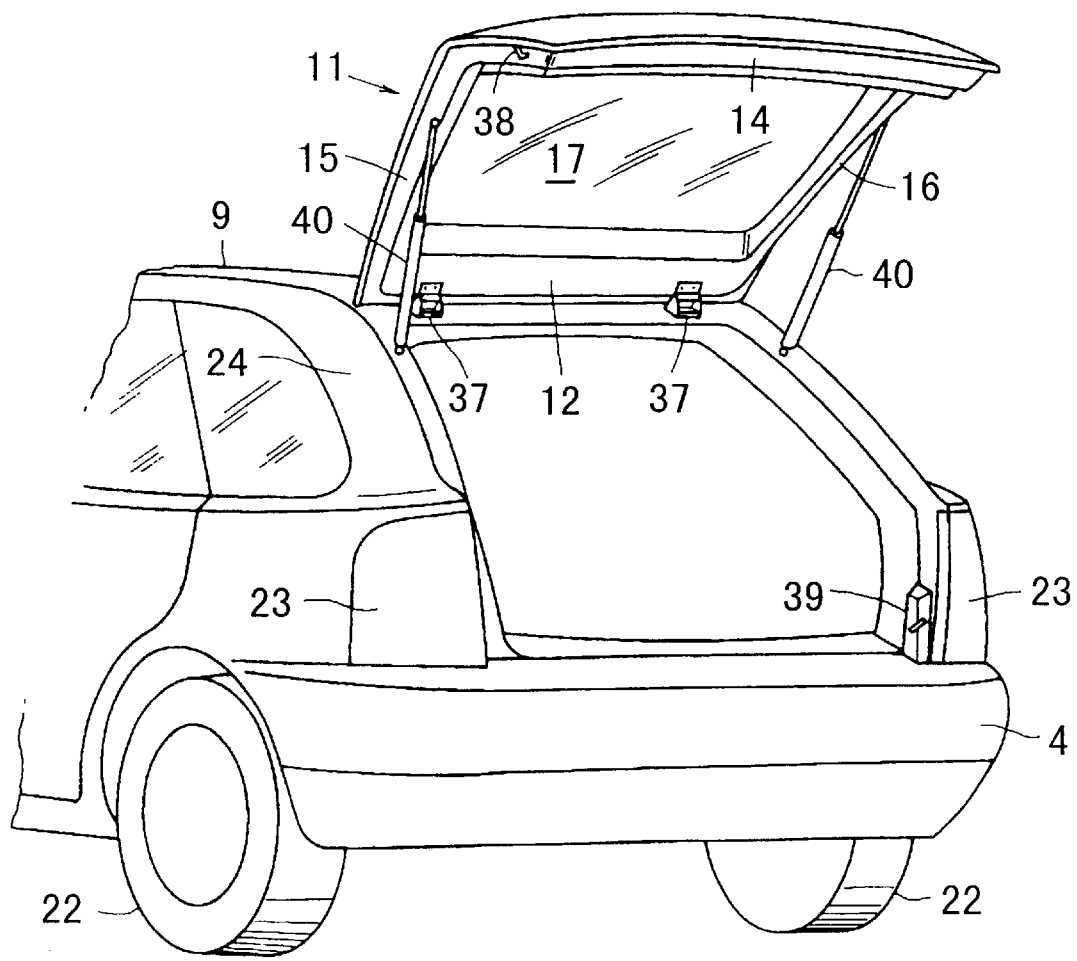
FIG. 11 is a perspective view showing the state of both doors being opened integrally.

As shown in FIGS. 7 and 11, the main door 11 is openably/closably supported at its under surface of the upper frame portion 12 on the rear concave portion of the roof panel 9 above the rear header 10 via a hinge means 37 consisting of a fixed bracket 34, a movable bracket 35, and a hinge As shown in FIGS. 9 and 11, a striker 38 is fixed to each lower outer surface of the right and left frame portions 15, 16 (only the frame portion 15 is illustrated) of said main door 11, and an electromagnetic-locking device 39 to lock- and unlock the striker 38 is mounted on the body side corresponding to this striker 38.

Figure 8:
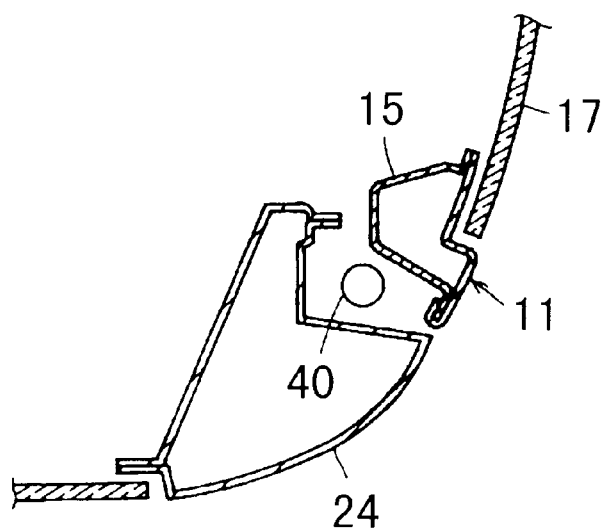
FIG. 8 is a sectional view taken in the direction of arrows along the line C—C of FIG. 4.

Further, as shown in FIGS. 8 and 11, dampers 40, 40 to give an assist force for opening/closing to the main door 11 are spanned between the right and left frame portions 15,16 and the main door 11, respectively.

Figure 10:
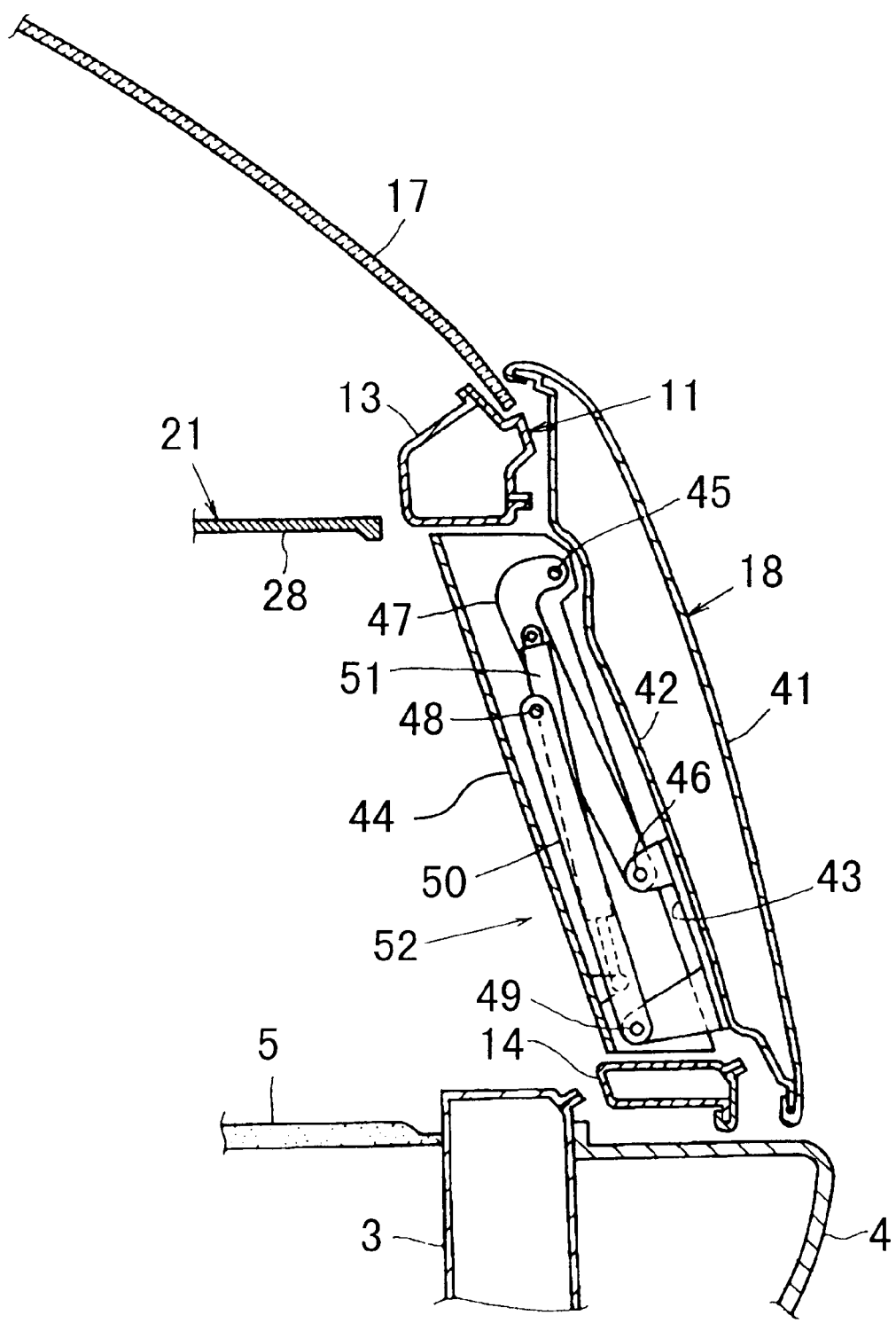
FIG. 10 is a sectional view taken in the direction of arrows along the line E—E of FIG. 4.

The supporting structure and the opening/closing mechanism of the sub door 18 on the main door 11 are formed as shown in FIGS. 9 and 10.

Said sub door 18 has an outer panel 41 and an inner panel 42 hemming jointed around their periphery each other, a bracket 43 for pivotally jointing a link is fixedly jointed to the lower front surface of the inner panel 42, and a hinge bracket 44 in ⊐ shape in plane view is fixedly jointed to the frame portion 15 of the main door.

Then, a first link 47 is spanned between a pin 45 on the hinge bracket 44 and a pin 46 on the upper protruded portion of the bracket 43, and a second link 50 is spanned between a pin 48 on the hinge bracket 44 and a pin 49 on the lower protruded portion of the bracket 43.

Additionally, a damper 51 to give an assist force for opening/closing to the sub door 18 is spanned between the first link 47 and the hinge bracket 44 in the midsection in the direction of the width of the vehicle between the first link 47 and the second link 50, and a link-type hinge mechanism 52 is composed of these elements 43 through 51 to move the sub door 18 vertically in parallel so that the door can be opened/closed. Further in FIGS. 9 and 10 only the left side of the structure of the link-type hinge mechanism 52 is shown, but the structure of the right side is formed symmetrically.

Further, as shown in FIG. 6, a striker 53 is fixed to the lower surface of the middle frame portion 13 of the main door 11, a locking device 54 to lock and unlock the striker 53 is fitted to the inner panel 42 of the sub door 18 corresponding to this striker 53, while an outer handle 55 to unlock the locking device 54 is fitted to the outer panel 41 of the sub door 18.

The illustrated embodiment is constituted as stated above, and an explanation of the functions will be then given as follows.

Figure 12:
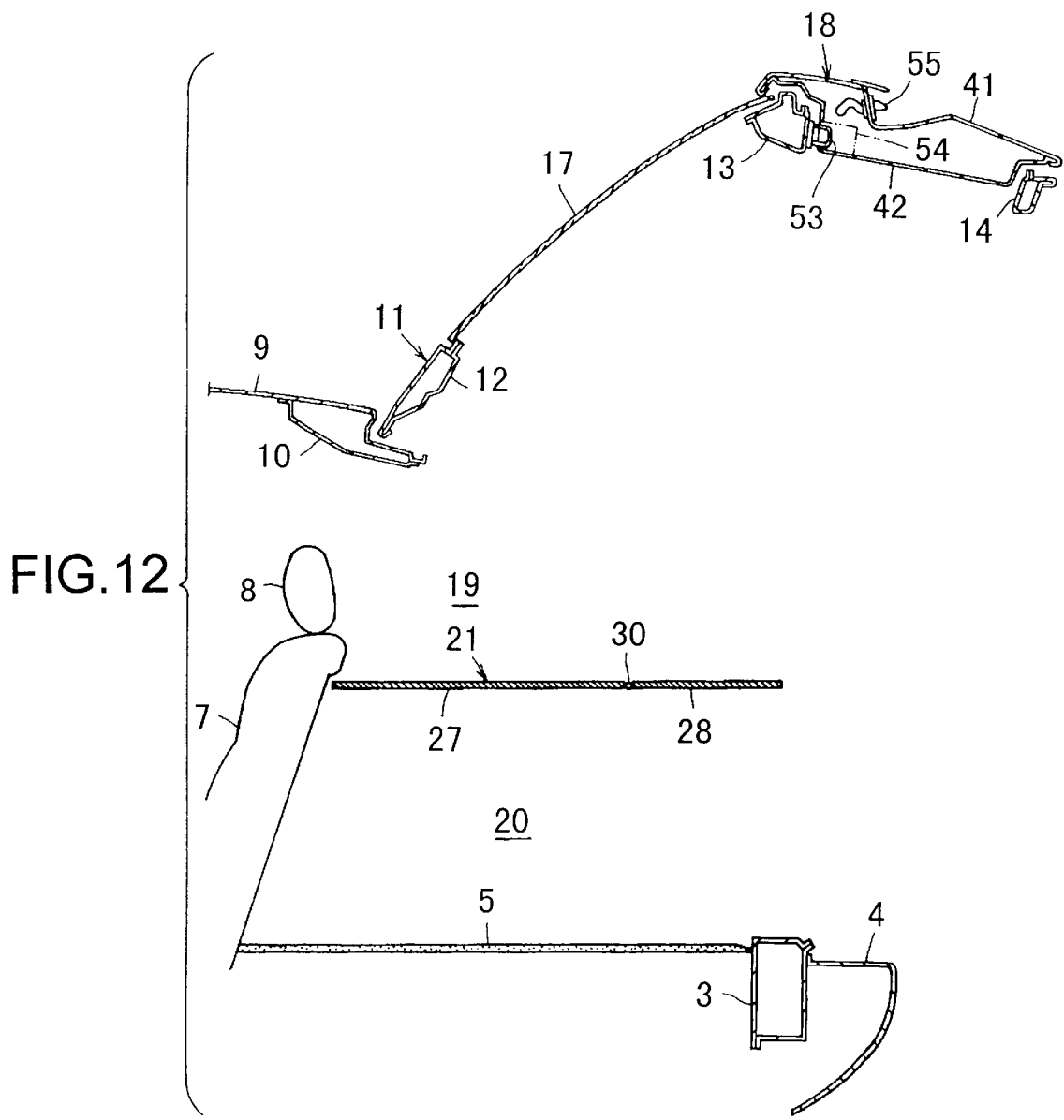
FIG. 12 is a sectional view showing the state of both doors being opened integrally.

After operating in the compartment the electromagnetic locking device 39 in FIG. 9 from the state of the doors being closed as shown in FIG. 6 to the unlocked position and releasing the striker 38 from the locking device 39, the main door 11 and the sub door 18 may be integrally operated to swing upwardly with the hinge means 37 as the supporting point and both of these doors 11 and 18 can be opened integrally as shown in FIGS. 11 and 12.

Figure 13:
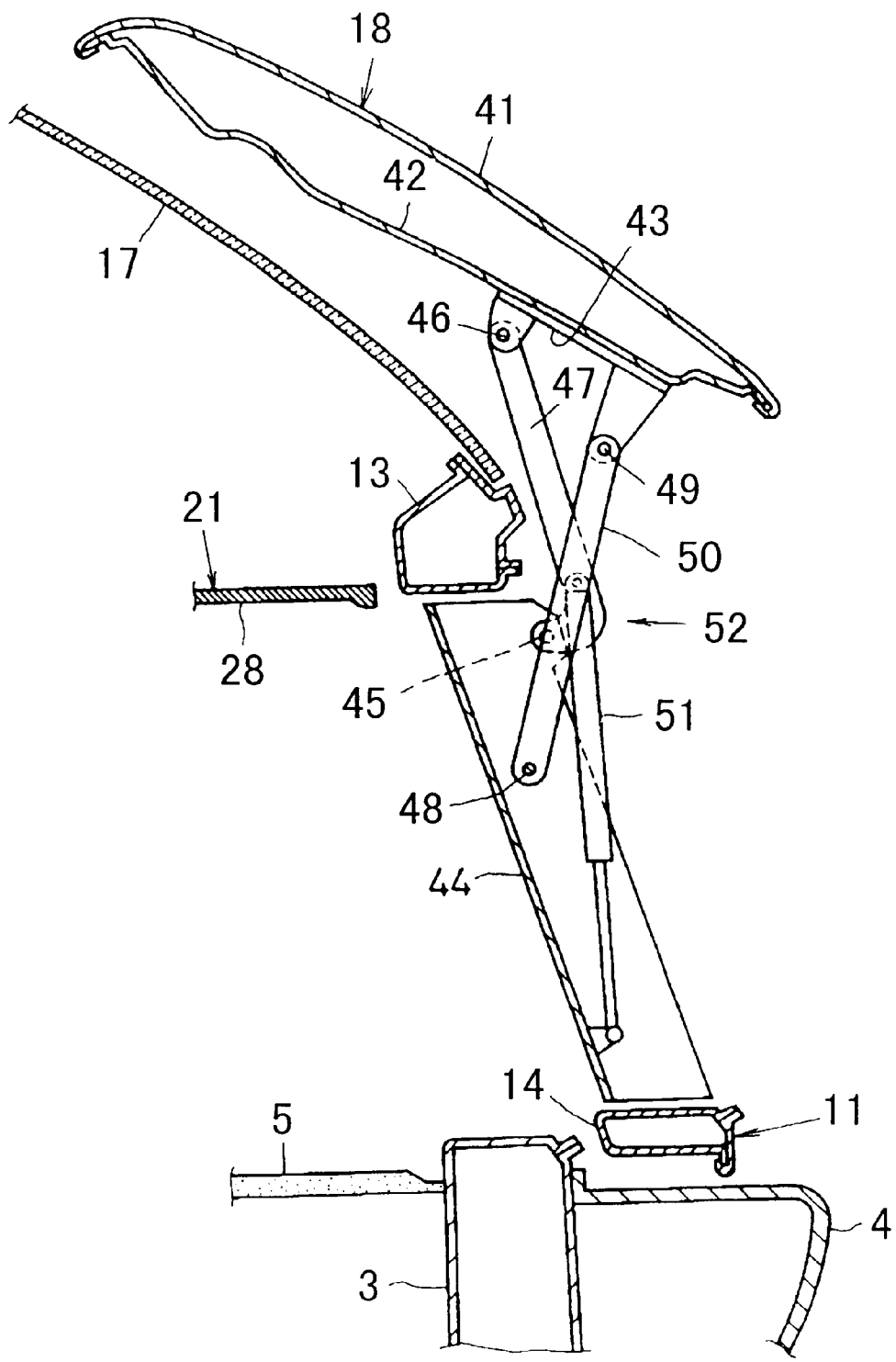
FIG. 13 is a sectional view showing the state of only a sub door being opened.
Figure 14:
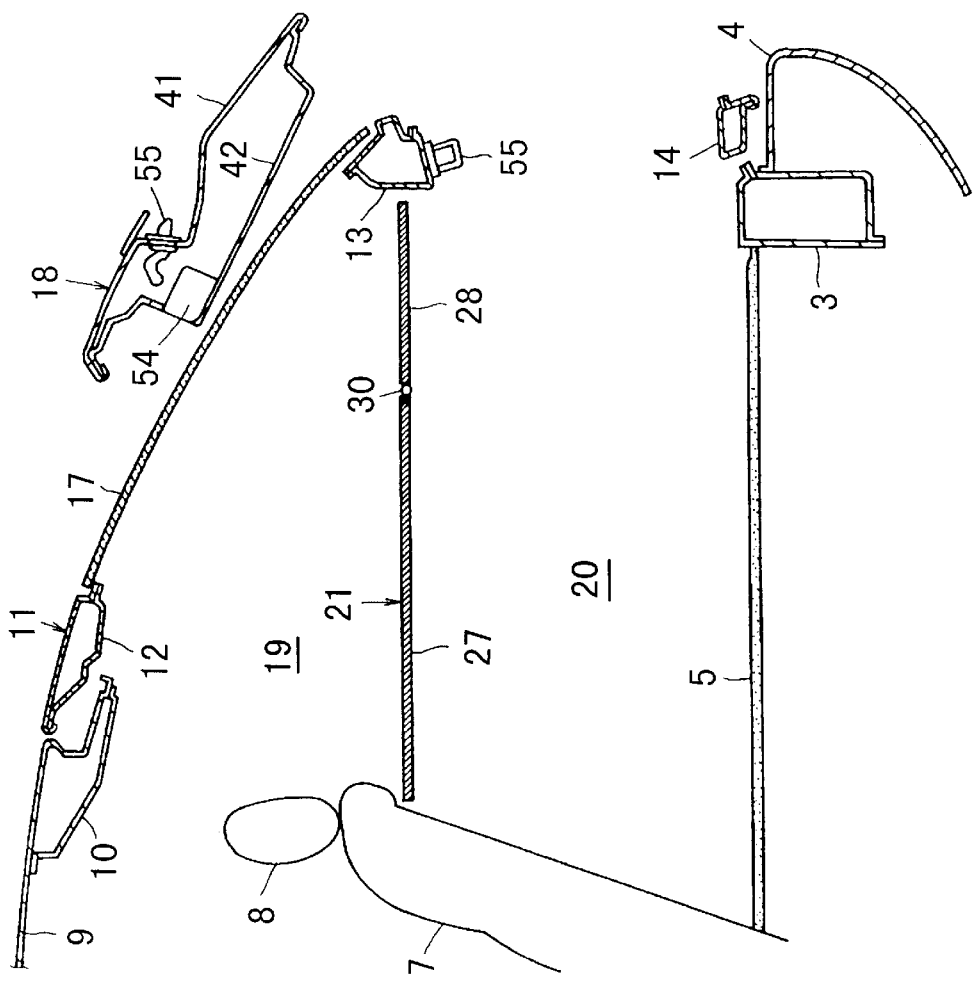
FIG. 14 is a sectional view showing the state of only a sub door being opened.

On the other hand, by operating the sub door 18 upwardly after operating the outer handle 55 from the state of the door being closed as shown in FIG. 6 and releasing the striker 53 from the locking device 54, the sub door 18 may be moved upwardly in parallel with two pins 45, 48 as supporting points along the moving trail of the pins 46 and 49 on the movable ends of the first link 47 and the second link 50 so that only the sub door 18 can be opened as shown in FIGS. 13 and 14.

Thus, according to the embodiments as shown in FIGS. 1 through 14 (embodiments corresponding to claim 1 through 4), the upper luggage space 19 and the lower luggage space 20 may be opened/closed at the same time as shown in FIGS. 11 and 12 (the mode of integrally opening/closing) when the door for the upper luggage space 19 (referring to the main door 11) and the door for the lower luggage space 20 (referring to the sub door 18) are integrally opened/closed.

Therefore, it becomes possible to secure a large space in which large luggage can be loaded and unloaded easily (such a luggage space as a hatchback-type vehicle has).

On the other hand, the luggage space 20 corresponding to the sub door 18 is opened/closed independently as shown in FIGS. 13 and 14 (the mode of independently opening/ closing) when the lower luggage space 20 is opened/closed by independently opening/closing the sub door 18.

Therefore, it becomes possible to secure an independent luggage space separated from the compartment (such a luggage space as a sedan-type vehicle has) (referring to the lower luggage space 20).

As stated above, the embodiment has advantages that it becomes possible to selectively use either an independent luggage space separated from the compartment or a large luggage space in which large luggage can be loaded and unloaded easily, and it becomes possible to keep the air-conditioning from lessening its effect when the independent luggage space is opened/closed, and possible to store, for example, dirty baggage and the like in the independent luggage space.

Additionally, the embodiment has advantages that as the door for the upper luggage space 19 (referring to the main door 11) is openably/closably supported on the vehicle body by the hinge means 37 and the door for the lower luggage space 20 (referring to the sub door 18) is openably/closably supported on the door for the upper luggage space 19 (referring to the main door 11) by the hinge means (referring to the link-type hinge mechanism 52), it becomes possible to load and unload large luggage in the large luggage space by opening/closing the door for the lower luggage space 20 (referring to the sub door 18) integrally with the door for the upper luggage space when the door of the upper luggage space 19 is opened/closed, and to load and unload luggage in the independent luggage space (referring to the lower luggage space 20) separated from the compartment when the door for the lower luggage space 20 (referring to the sub door 18) is opened/closed.

Further, the embodiment has advantages that it becomes possible to use the lower luggage space 20 as an independent luggage space (the mode of separating the luggage spaces) when the upper luggage space 19 is separated from the lower luggage space 20 by the partition member provided movably relative to the vehicle body, and it becomes possible to form one large communicable luggage space out of the upper and lower luggage spaces 19,20 (the mode of communicable luggage spaces) when the upper luggage space 19 and the lower luggage space 20 are made communicable with each other by the partition member (referring to package tray 21) as shown in FIGS. 2 and 3.

The embodiment also has advantages that when opening/closing the rear tray 28 as shown by a phantom line in FIG. 1, it becomes possible to load and unload small articles from the compartment into the lower luggage space 20, improving the availability.

Further, the embodiment has advantages that it becomes possible to open/close the door for the lower luggage space 20 (referring to the sub door 18) easily even if the space for opening/closing the door existing backward from the vehicle is small, as the door for said lower luggage space 20 (referring to the sub door 18) is moved vertically in parallel as a function of the link member (referring to the link-type hinge mechanism) to open/close.

Figure 15:
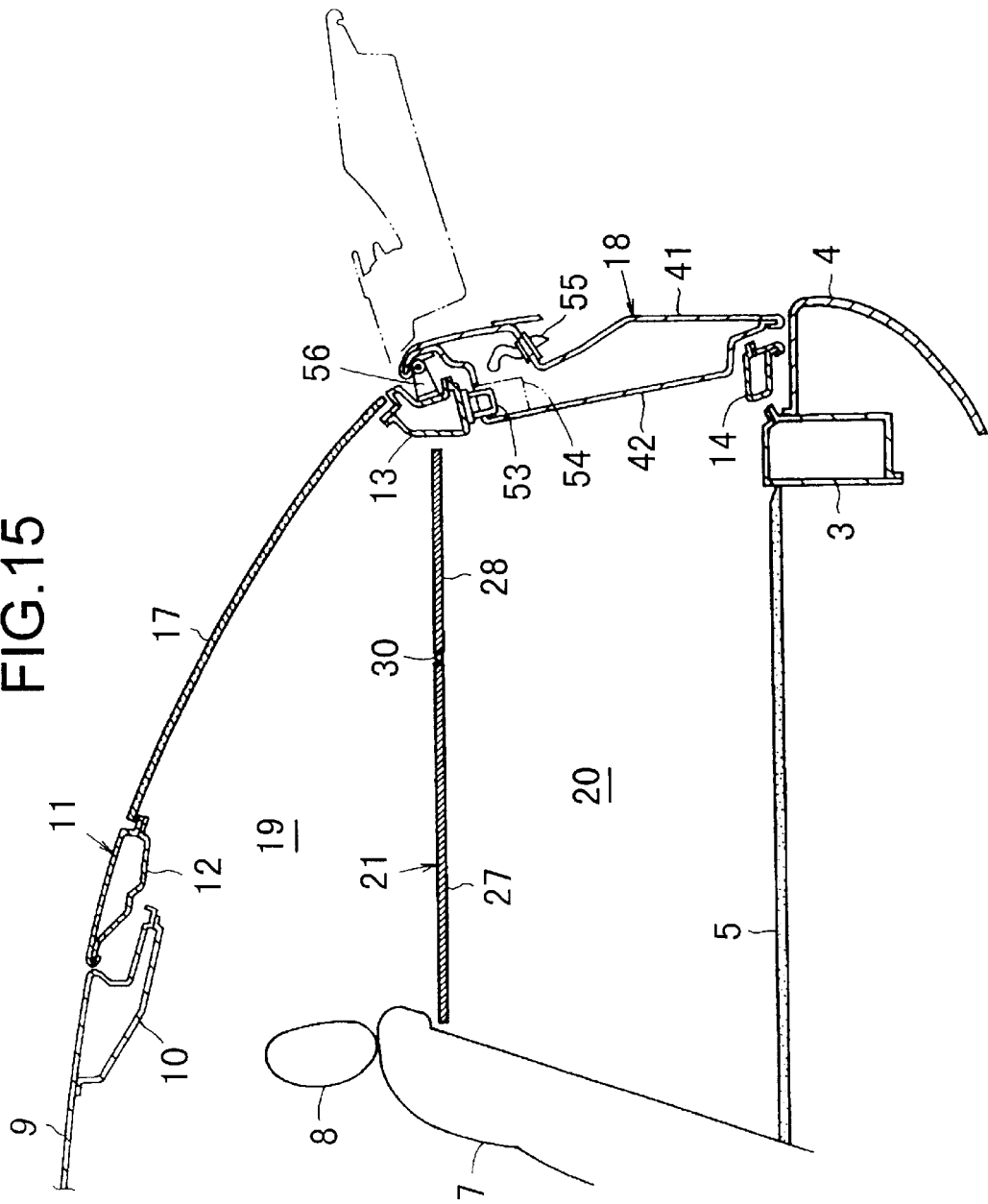
FIG. 15 is a sectional view showing another embodiment of an opening/closing rear component structure of a vehicle according to the present invention.

FIG. 15 shows another embodiment (an embodiment corresponding to claims 1, 2, 3, 5) of an opening/closing rear component structure of a vehicle, wherein the upper portion of the sub door 18 for the lower luggage space 20 is openably/closably supported on the back side of the middle frame portion 13 via a hinge means 56.

Thus constituted, as said door for the lower luggage space 20 (referring to the sub door 18) is pivotally opened/closed relative to the door for the upper luggage space 19 (referring to the main door 11) with the hinge means 56 as pivotal axis on the upper portion of the door, it becomes possible to simplify the opening/closing mechanism by eliminating a complicated mechanism of opening/closing doors such as a link member, and thus improving the opening/closing operability of the sub door 18 by making the direction of opening/closing of each door 11 and 18 the same.

Further, being of the same structure in other respects as the above mentioned embodiment, and achieving almost the same function and effect, a detailed explanation will be omitted, by giving the same numerals to the same portions in FIG. 15 as in the preceding figure.

FIGS. 16 through 30 show other alternative embodiment of an opening/closing rear component structure of a vehicle. Also in this embodiment, a detailed explanation is omitted, by giving the same numerals to the same or similar portions as in the preceding embodiments.

In this embodiments shown in FIGS. 16 through 30, a luggage board 60 (referring to FIG. 16) on the side of the vehicle body is formed detachably relative to the vehicle body and a luggage board 61 on the side of the door is secured to the middle frame portion 13 and is formed movably relative to the vehicle body, and the luggage space in the rear of a vehicle is separated into the upper luggage space 19 and the lower luggage space 20 (the so-called luggage room space) by both of these luggage boards 60 and 61(partition members). Further, 62 shown in FIG. 23 is a seal rubber to seal between the luggage boards 60 and 61, and this seal rubber 62 is fitted to the underside of the front end of the luggage board 61. And 63 in FIG. 16 indicates a floor.

Figure 17:
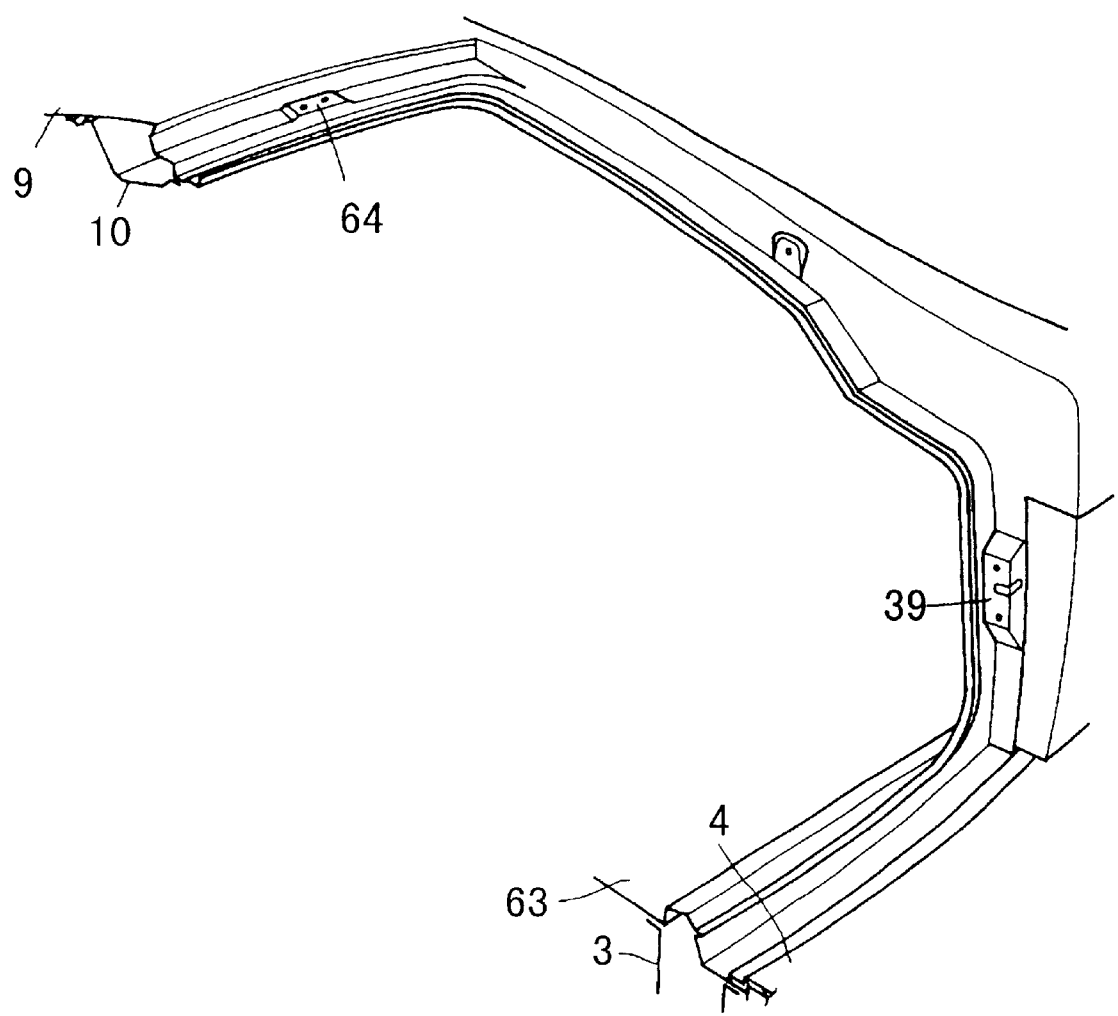
FIG. 17 is a partial perspective view of a vehicle body.

FIG. 17 is a partial perspective view of the vehicle body, and the main door 11 is openably/closably supported via the hinge means 37 (referring to FIG. 21) on the hinge fixture portion 64 of the body.

Figure 18:
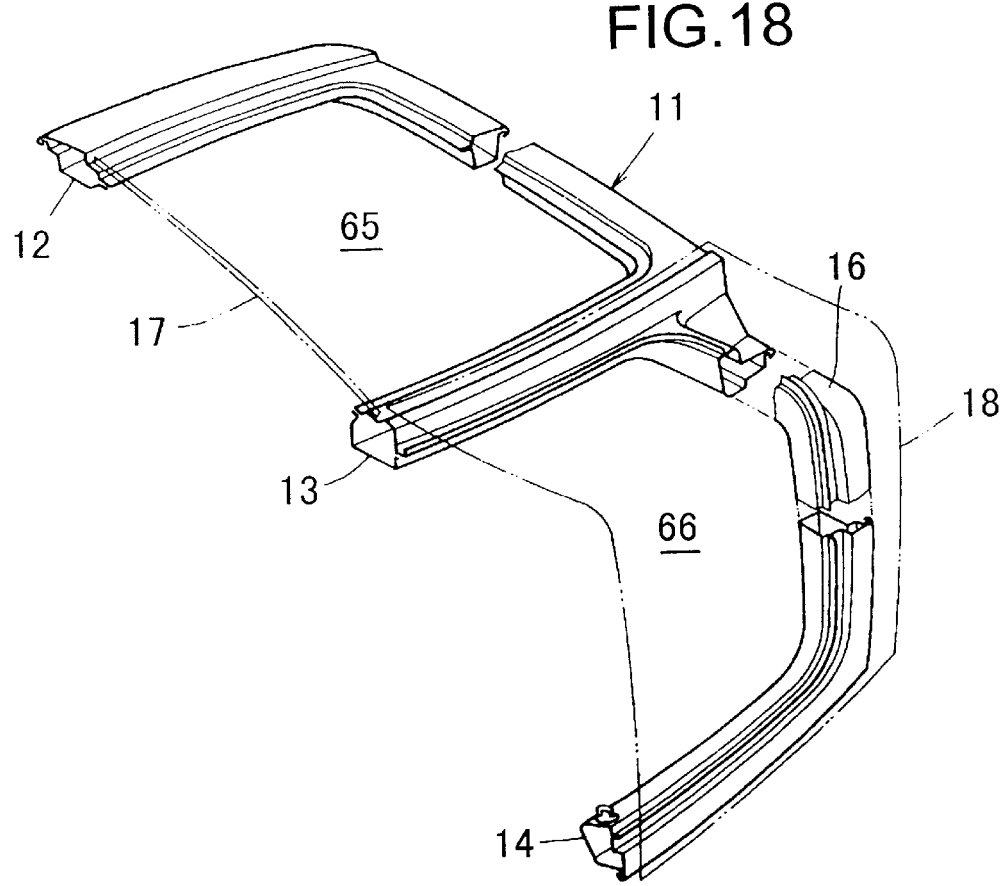
FIG. 18 is a partial perspective view of a main door.
Figure 19:
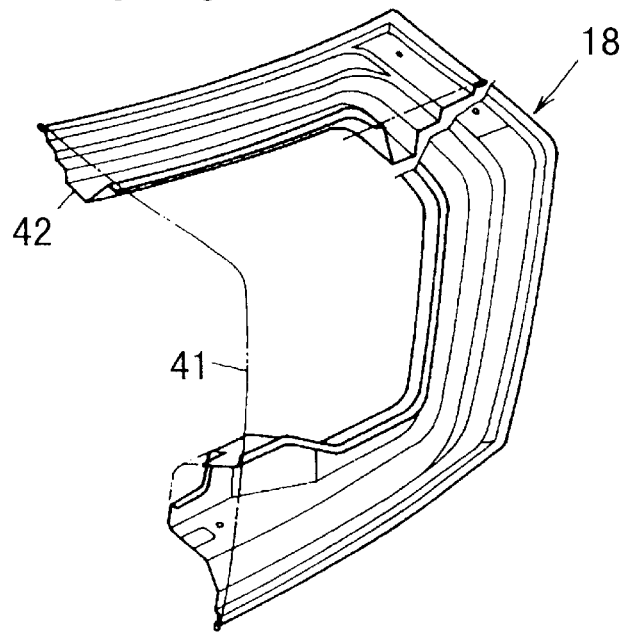
FIG. 19 is a partial perspective view of a sub door.

FIG. 18 is a partial perspective view of the main door 11 formed similarly in 日 shape in rear view as in the preceding embodiments, and a rear window glass 17 is mounted on the upper opening portion 65 of the 日 shape, while the sub door 18 shown in FIG. 19 is openably/closably supported on the lower opening portion 66 of the 日 shape.

Figure 20:
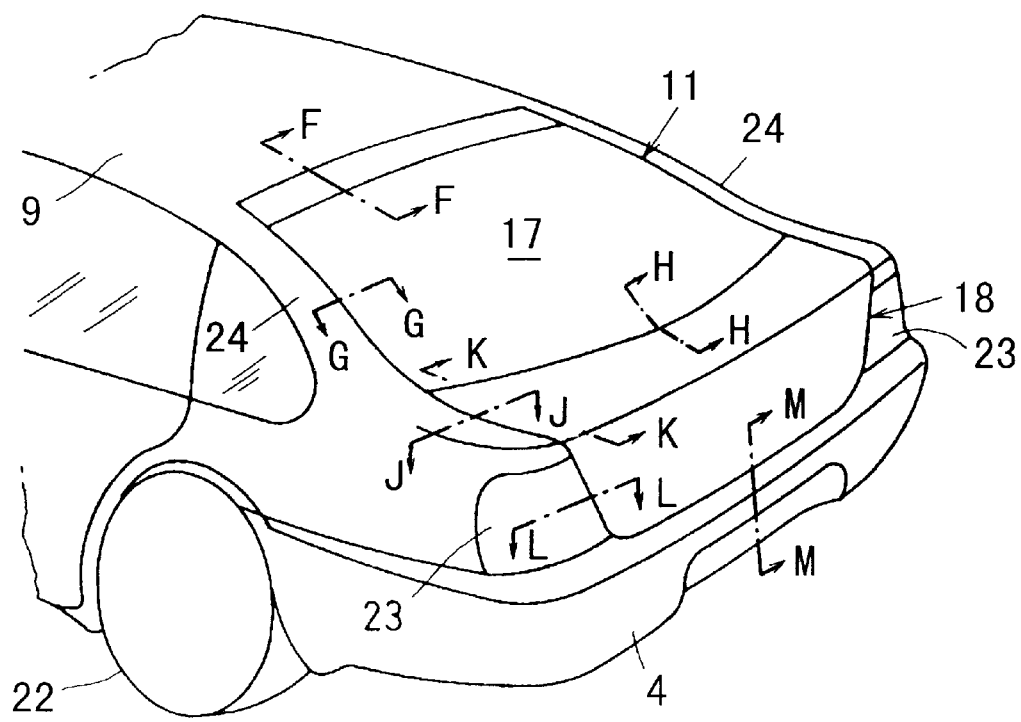
FIG. 20 is a partial perspective view of a vehicle.
Figure 21:
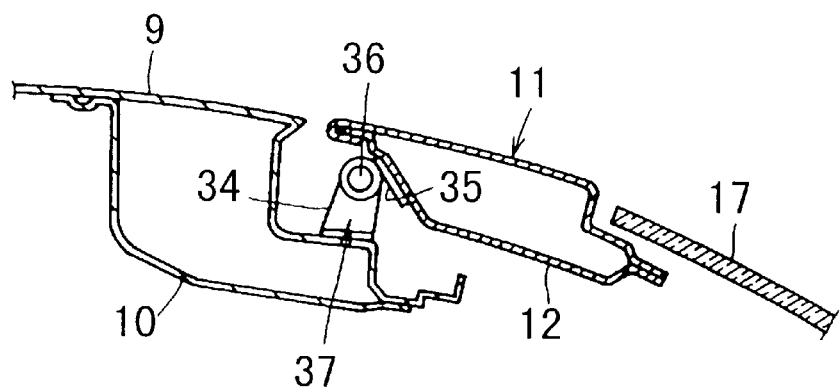
FIG. 21 is a sectional view taken in the direction of arrows along the line F—F of FIG. 20.
Figure 22:
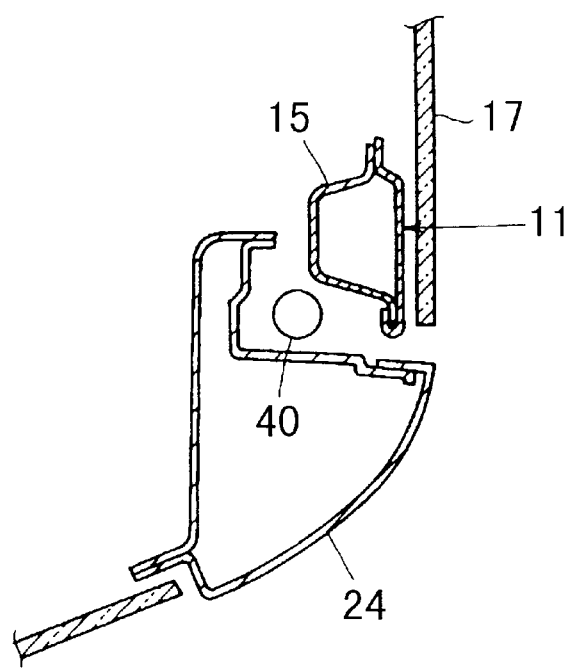
FIG. 22 is a sectional view taken in the direction of arrows along the line G—G of FIG. 20.
Figure 23:
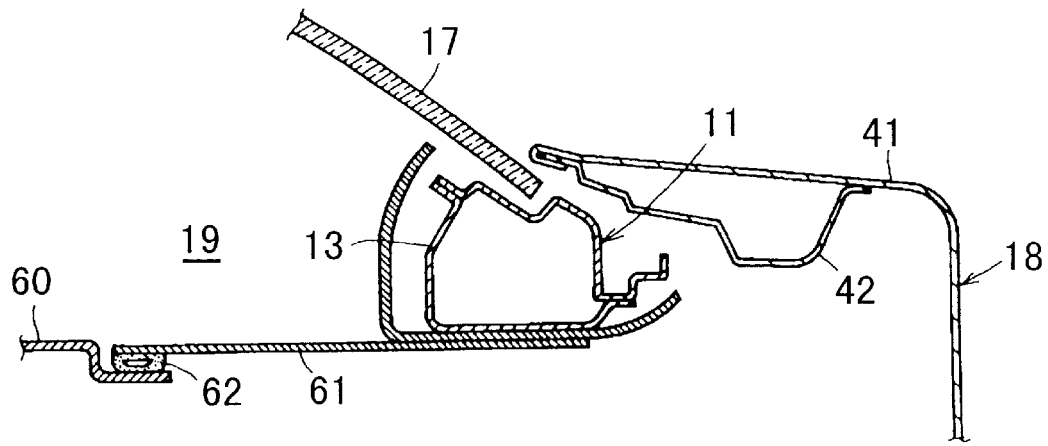
FIG. 23 is a sectional view taken in the direction of arrows along the line H—H of FIG. 20.
Figure 24:
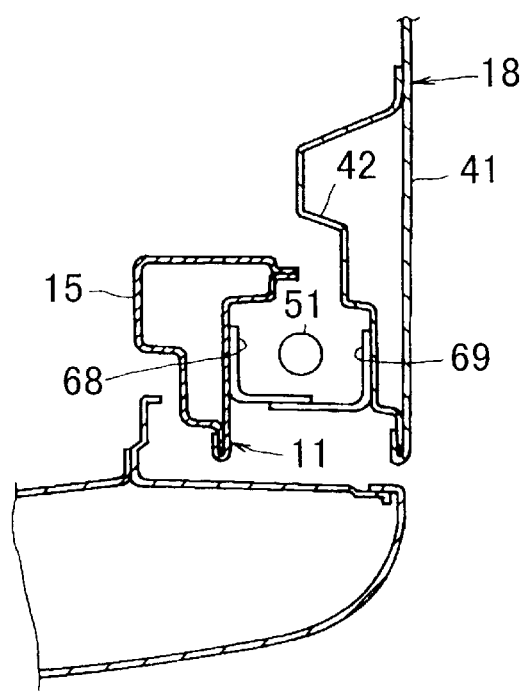
FIG. 24 is a sectional view taken in the direction of arrows along the line J—J of FIG. 20.
Figure 25:
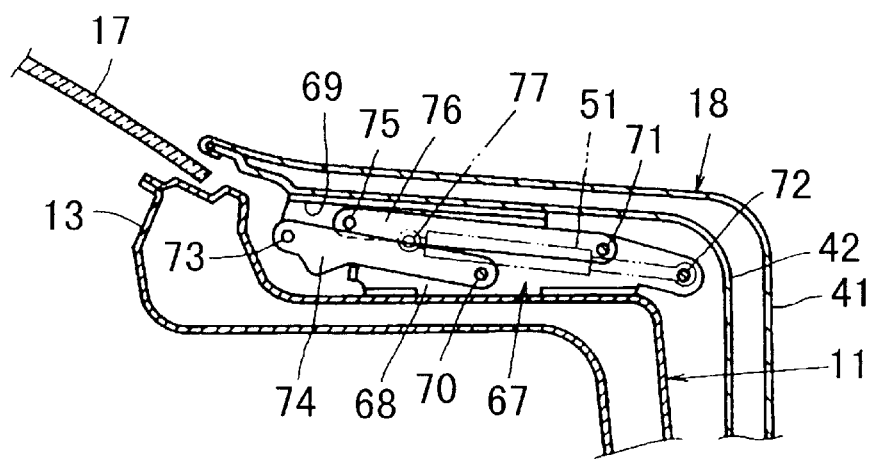
FIG. 25 is a sectional view taken in the direction of arrows along the line K—K of FIG. 20.
Figure 26:
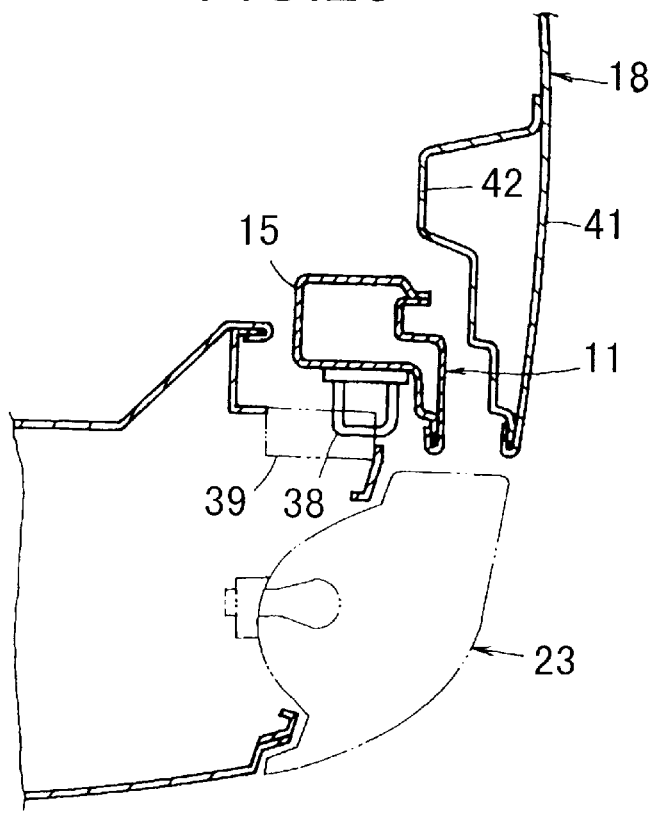
FIG. 26 is a sectional view taken in the direction of arrows along the line L—L of FIG. 20.
Figure 27:
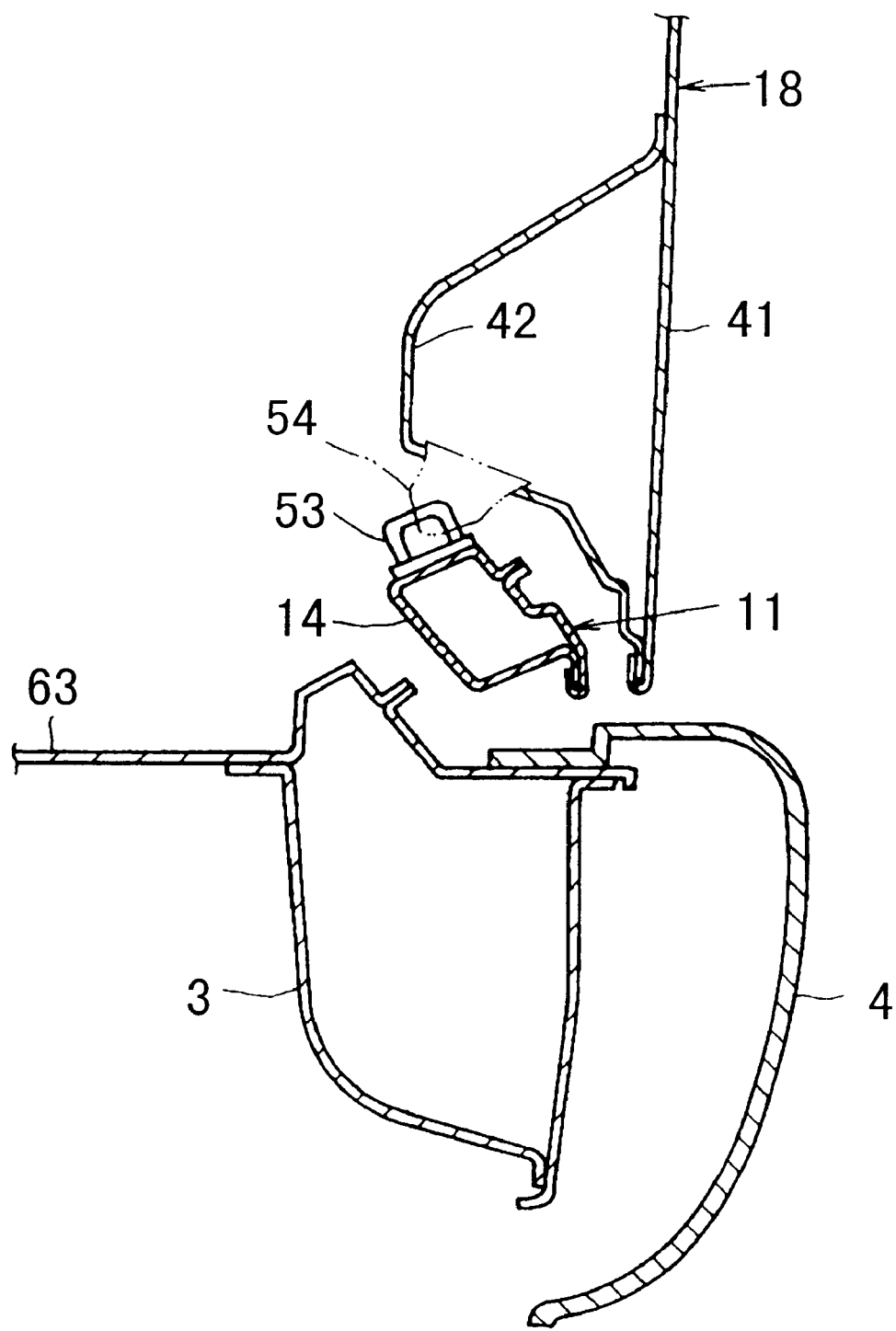
FIG. 27 is a sectional view taken in the direction of arrows along the line M—M of FIG. 20.

FIG. 20 is a partial perspective view of the vehicle taken from an upper rearward position, FIG. 21 is a sectional view taken in the direction of arrows along the line F—F of FIG. 20, FIG. 22 is a sectional view taken in the direction of arrows along the line G—G of FIG. 20, FIG. 23 is a sectional view taken in the direction of arrows along the line H—H of FIG. 20, FIG. 24 is a sectional view taken in the direction of arrows along the line J—J of FIG. 20, FIG. 25 is a sectional view taken in the direction of arrows along the line K—K of FIG. 20, FIG. 26 is a sectional view taken in the direction of arrows along the line L—L of FIG. 20, and FIG. 27 is a sectional view taken in the direction of arrows along the line M—M of FIG. 20.

As shown in FIG. 25, the sub door 18 is openably/closably mounted via link-type hinge mechanism 67 on the right side and on the left side of the middle portion 13 of the main door 11. But only the link-type hinge mechanism 67 on the left side is shown in the figure, but the link-type hinge mechanism 67 on the light side is formed symmetrical.

Figure 29:
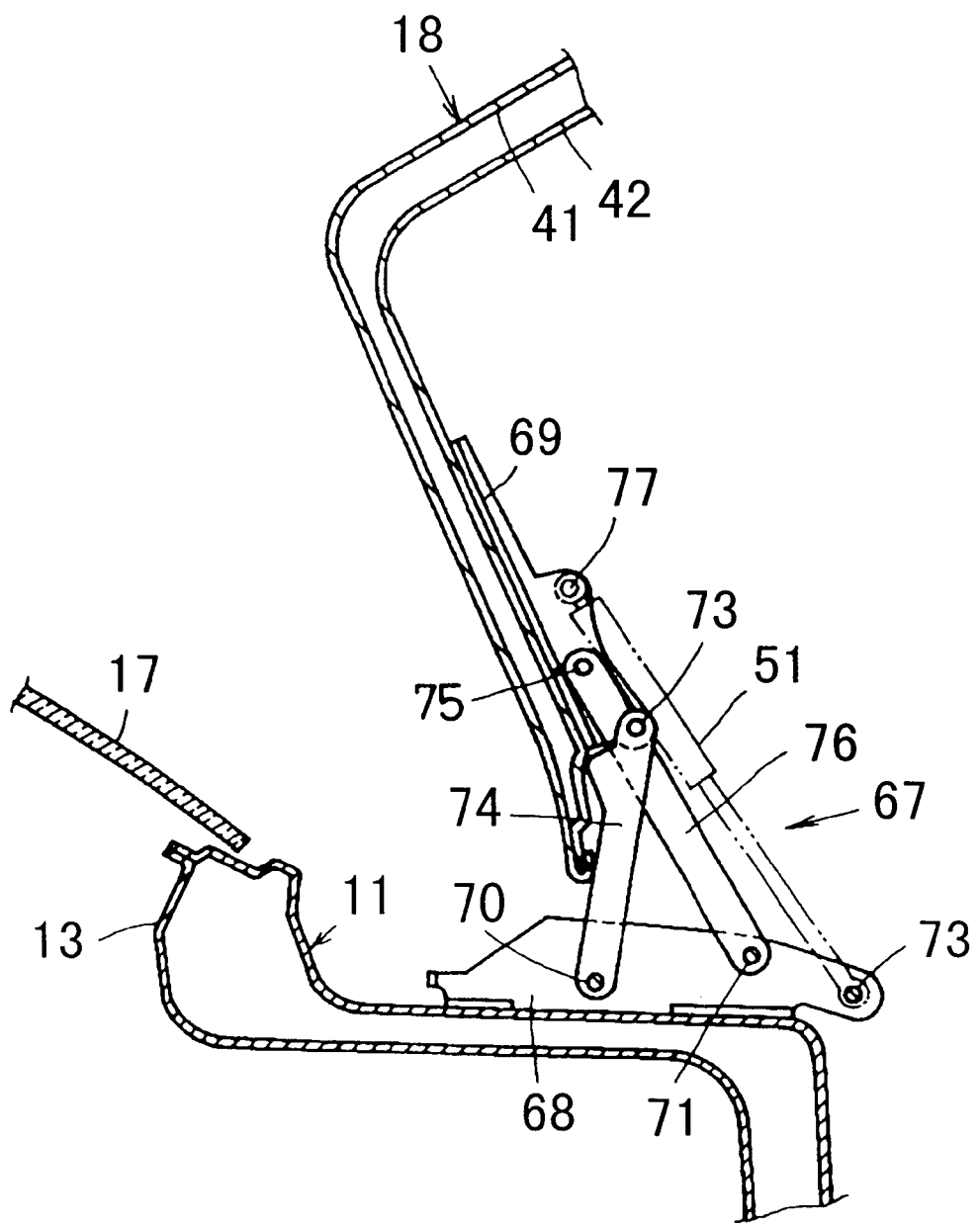
FIG. 29 is a sectional view showing the state of only a sub door being opened.

This link-type hinge mechanism 67 is so formed as shown in FIGS. 25 and 29.

More specifically, a hinge bracket 68 is secured to the main door 11, whereas the hinge bracket 69 also secured to the sub door 18. Thus, pins 70, 71, and 72 are provided to the hinge bracket 68 on the main door 11 as pivots when opening/closing the sub door 18, and a first link 74 is spanned between the front pin 70 on the hinge bracket 68 and a front pin 73 on the hinge bracket 60 on the sub door 18.

Also a second link 76 is spanned between the middle pin 71 and a middle pin 75 on the hinge bracket 69 on the sub door 18.

Further, the damper 51 to give an assist force for opening/closing the sub door 18 is spanned between the rear pin 72 and a rear pin 77 on the hinge bracket 69 on the sub door 18.

Illustrated embodiment is formed as stated above, and an explanation about functions will be given as follows.

Figure 16:
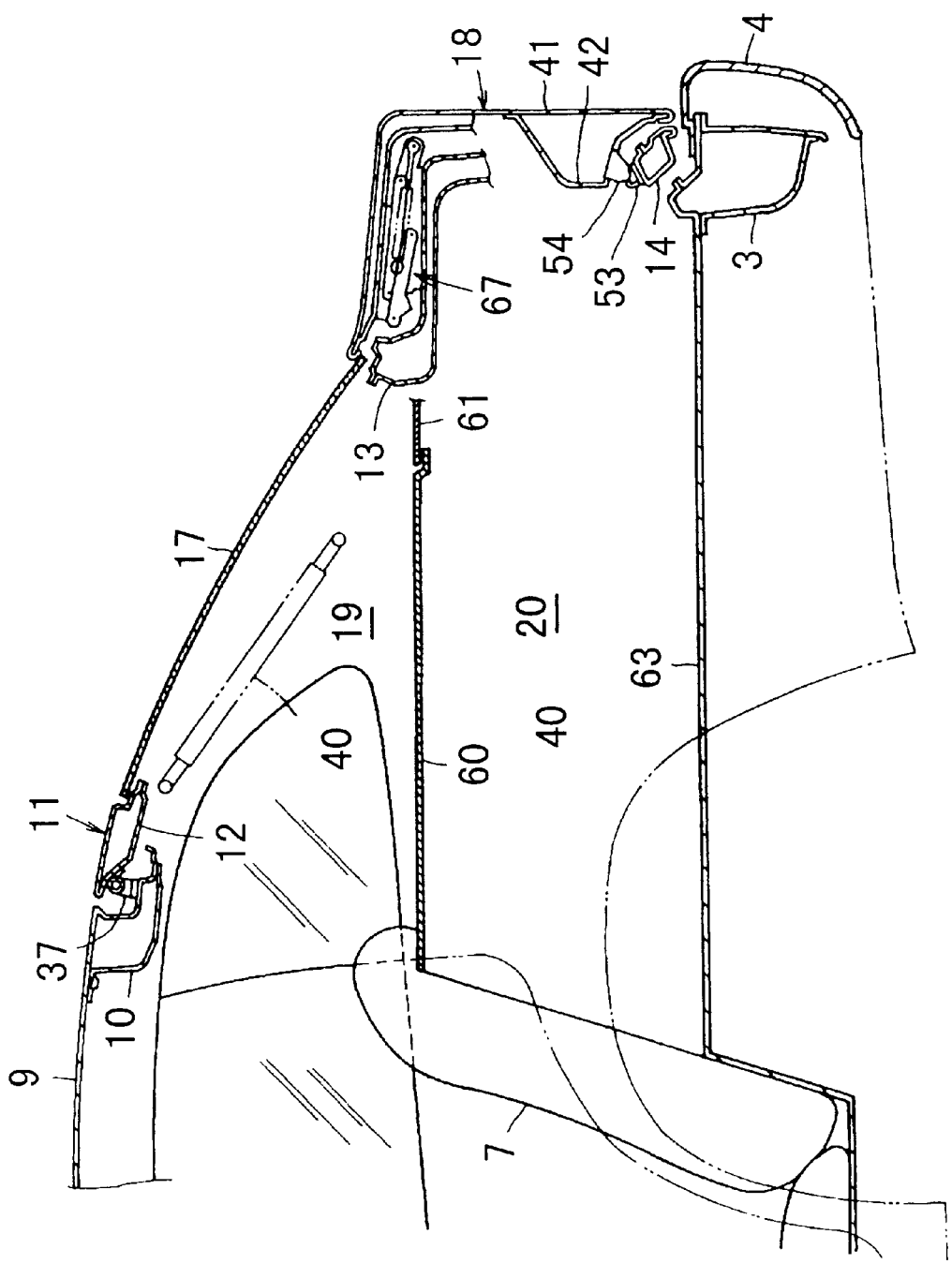
FIG. 16 is a sectional view showing another alternative embodiment of an opening/closing rear component structure of a vehicle according to the present invention.
Figure 28:
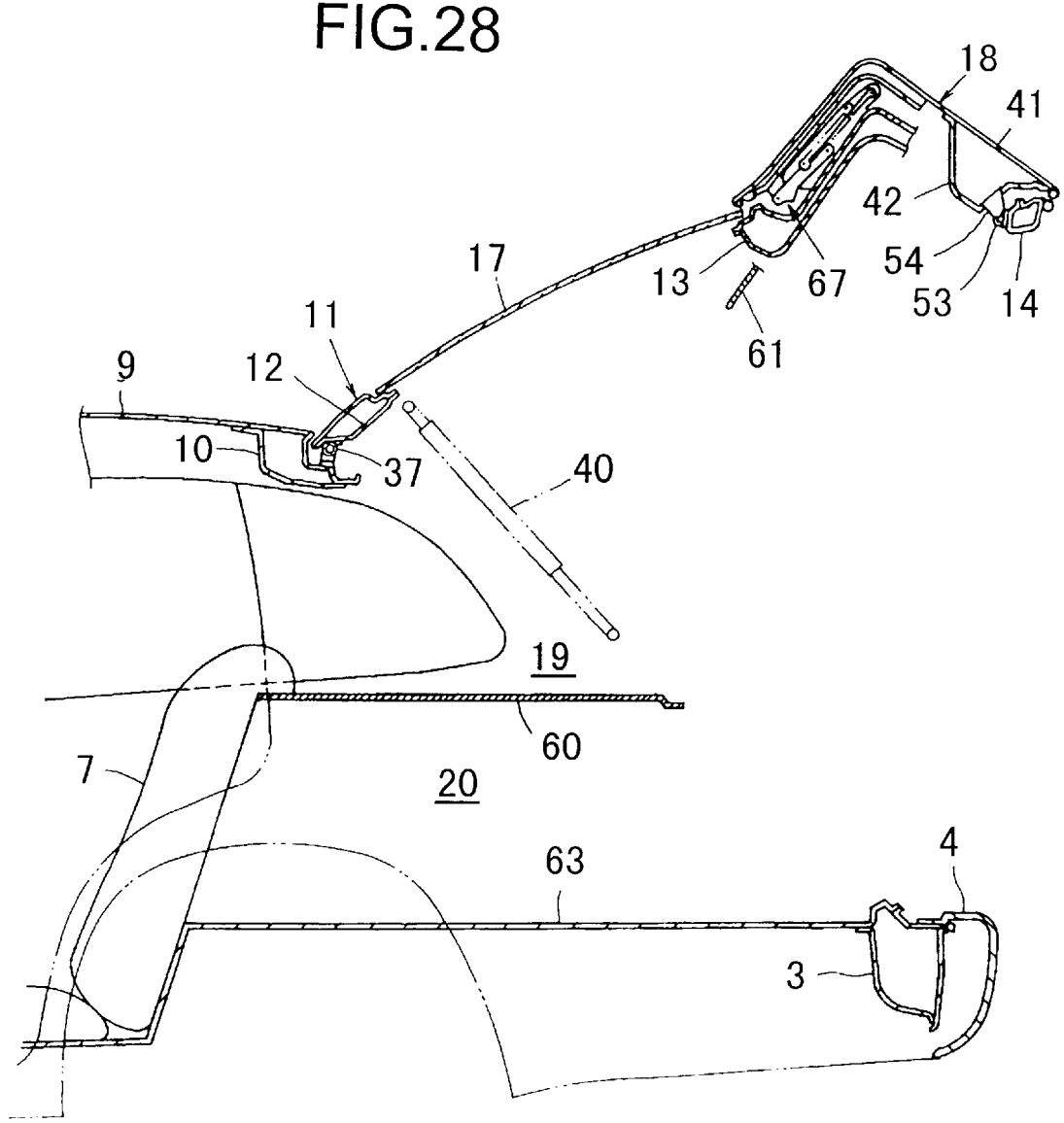
FIG. 28 is a sectional view showing the state of both doors being opened integrally.

After operating in the compartment the electromagnetic locking device 39 in FIG. 26 from the state of the doors being closed as shown in FIG. 16 to the unlocked position and releasing the striker 38 from the locking device 39, the main door 11 and the sub door 18 may be integrally operated to swing upwardly with the hinge means 37 (referring to FIG. 21) as the supporting point and both of these doors 11 and 18 can be opened integrally as shown in FIG. 28.

Figure 30:
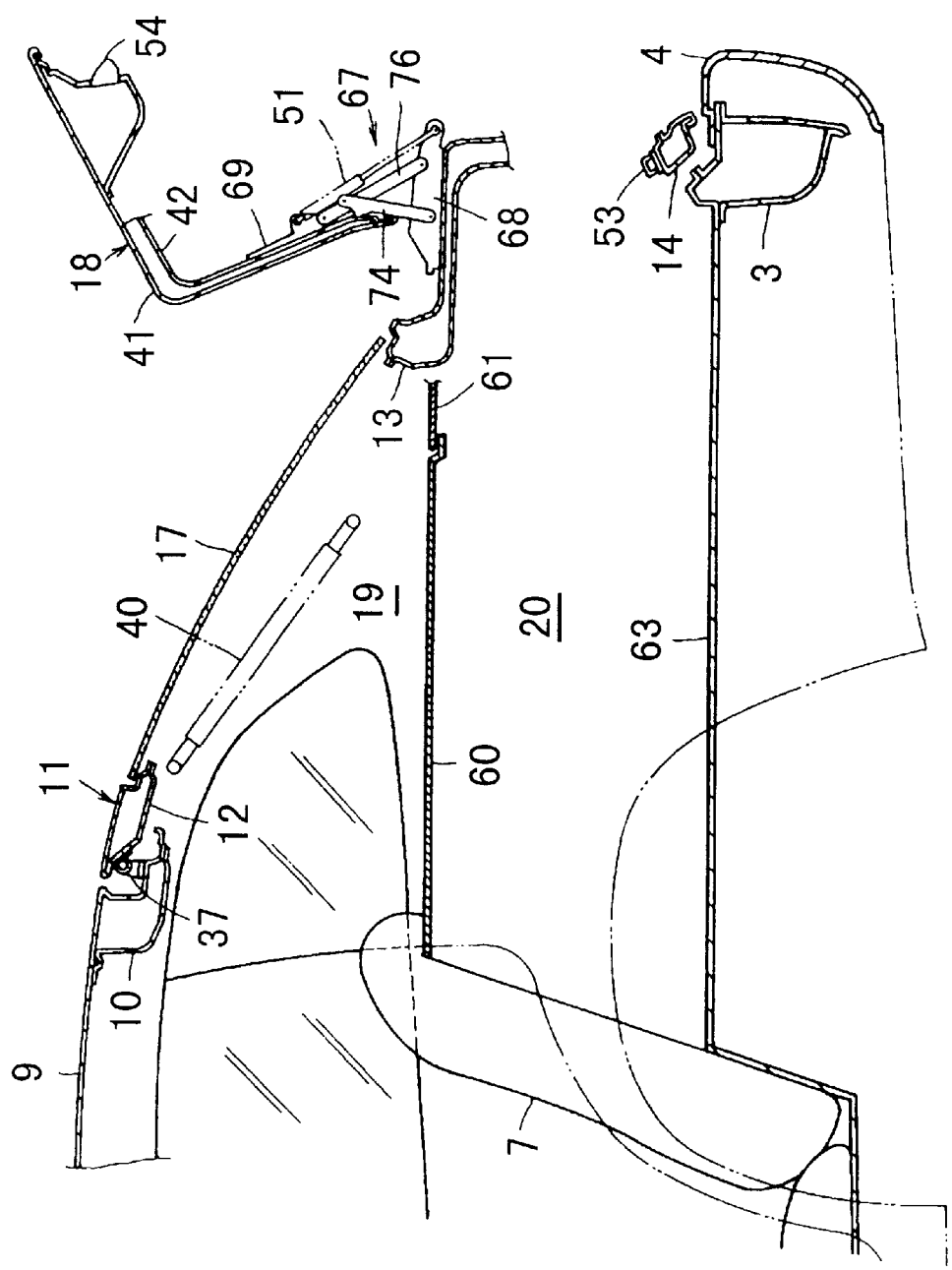
FIG. 30 is a sectional view showing the state of only a sub door being opened.

On the other hand, by operating the sub door 18 upwardly through the link-type hinge mechanism 67 after operating the outer handle 55 from the state of the door being closed as shown in FIG. 16 and releasing the striker 53 from the locking device 54 in FIG. 27, the sub door 18 may be moved upwardly and then opened forwardly as shown in FIGS. 29 and 30 with two pins 70, 71 as supporting points along the moving trail of the pins 73 and 75 on the movable ends of the first link 74 and the second link 76.

Thus, according to the embodiments as shown in FIGS. 16 through 30 (embodiment corresponding to claim 1, 2, 4), the upper luggage space 19 and the lower luggage space 20 may be opened/closed at the same time (the mode of integrally opening/closing) when the door for the upper luggage space 19 (referring to the main door 11) and the door for the lower luggage space 20 (referring to the sub door 18) are integrally opened/closed.

Therefore, it becomes possible to secure a large space in which large luggage can be loaded and unloaded easily (such a luggage space as a hatchback-type vehicle has).

On the other hand, the luggage space 20 corresponding to the sub door 18 is opened/closed independently (the mode of independently opening/closing) when the lower luggage space 20 is opened/closed by independently opening/closing only the sub door 18.

Therefore, it becomes possible to secure an independent luggage space separated from the compartment (such a luggage space as a sedan-type vehicle has).

As stated above, the embodiment has advantages that it becomes possible to selectively use either an independent luggage space separated from the compartment (referring to the lower luggage space 20) or a large luggage space in which large luggage can be loaded and unloaded easily, and it becomes possible to keep the air-conditioning from lessening its effect when the independent luggage space is opened/closed, and possible to store, for example, dirty baggage and the like in the independent luggage space.

Additionally, the embodiment has advantages that as the door for the upper luggage space 19 (referring to the main door 11) is openably/closably supported on the vehicle body by the hinge means 37 and the door for the lower luggage space 20 (referring to the sub door 18) is openably/closably supported on the door for the upper luggage space 19 (referring to the main door 11) by the hinge means (referring to the link-type hinge mechanism 67), it becomes possible to load and unload large luggage in the large luggage space by opening/closing the door for the lower luggage space 20 (referring to the sub door 18) integrally with the door for the upper luggage space when the door of the upper luggage space 19 (referring to the main door 11) is opened/closed, and to load and unload luggage in the independent luggage space (referring to the lower luggage space 20) separated from the compartment when the door for the lower luggage space 20 (referring to the sub door 18) is opened/closed.

Further, the embodiment has advantages that it becomes possible to use the lower luggage space 20 as an independent luggage space (the mode of separating the luggage spaces) when the upper luggage space 19 is separated from the lower luggage space 20 by the partition member (referring to the luggage board 60,61) provided movably relative to the vehicle body, and it becomes possible to form one large communicable luggage space out of the upper and lower luggage spaces 19,20 (the mode of communicable luggage spaces) when the upper luggage space 19 and the lower luggage space 20 are made communicable with each other by the partition member (referring to the luggage board 60, 61).

The constitution of the present invention corresponds to the above mentioned embodiment, the door for the upper luggage space in the present invention corresponds to the main door 11 of the embodiment; the same shall apply hereinafter;

the door for the lower luggage space corresponds to the sub door 18, the hinge means for opening/closing the door for the lower luggage space corresponds to the link-type hinge mechanism 52, 67, and the hinge means 56, the partition member corresponds to the package tray 21, the luggage boards 60, 61, and the link member corresponds to the link-type hinge mechanism 52, but the present invention is, however, not limited to the constitution of the above mentioned embodiment.

What is claimed is:

1. An opening/closing rear component structure of a vehicle for opening/closing a luggage space provided in the rear of the vehicle, comprising;

an upper luggage space and a lower luggage space;

an upper door for opening/closing the upper luggage space, an opening for in said upper door corresponding to the lower luggage space, a lower door for opening(closing the lower luggage space, the upper door and the lower door being effected to selectively take one of a mode of only opening/closing the upper door and the lower door integrally so that the upper luggage space and the lower luggage space are opened/closed together, and a mode of opening/closing only the lower door independently to open/close the lower luggage space, a first locking mechanism for locking the upper door against a vehicle body at the opposite sides of the upper door when closed, and a second locking mechanism for locking the lower door against the upper door when closed.

2. An opening/closing rear component structure of a vehicle as set forth in claim 1, wherein:

said door for the upper luggage space is openably/closably supported on the vehicle body by a first hinge means, and said door for the lower luggage space is openably/closably supported on the door for the upper luggage space by a second hinge means.

3. An opening closing rear component structure of a vehicle as set forth in claim 1, comprising;

a partition member separating the upper luggage space from the lower luggage space, said partition member being provided movably relative to the vehicle body, and said partition member being adapted to selectively adopt one of a mode of separating the upper luggage space from the lower luggage space, and a mode of making both of the upper and lower luggage spaces communicable with each other.

4. An opening/closing rear component structure of a vehicle as set forth in claim 2, comprising:

a partition member separating the upper luggage space from the lower luggage space, said partition member being provided movably relative to the vehicle body, and said partition member being adapted to selectively adopt one of a mode of separating the upper luggage space from the lower luggage space, and a mode of making both of the upper and lower luggage spaces communicable with each other.

5. An opening/closing rear component structure of a vehicle as set forth in claim 2, wherein;

said lower door for lower luggage space is mounted to said upper door via a link member so that said door for the lower luggage space may be opened/closed by moving vertically in parallel.

6. An opening/closing rear component structure of a vehicle as set forth in claim 2, wherein;

an upper portion of said door for the lower luggage space is openably/closably supported on said door for the upper luggage space via openably/closably supported on said door for the upper luggage space via said second hinge means.

7. An opening/closing rear component structure of a vehicle as set forth in claim 1, wherein;

said second locking mechanism includes a lock means for locking with the upper door at a lower portion of said upper door.

8. An opening/closing rear component structure of a vehicle as set forth in claim 1, wherein;
   the first locking mechanism includes a lock means for locking with the upper door at an upper portion.

9. An opening/closing rear component structure of a vehicle as set forth in claim 1, comprising;
   a partition member separating the upper luggage space from the lower luggage space,
   said partition member being provided movably relative to the vehicle body, and
   said partition member being adapted to selectively adopt one of a mode of separating the upper luggage space from the lower luggage space, and a mode of making both of the upper and lower spaces communicable with each other.

\* \* \* \* \*